United States Patent
Shima et al.

(10) Patent No.: US 6,545,766 B1
(45) Date of Patent: *Apr. 8, 2003

(54) PRINTER HAVING A PRINT MANAGEMENT DEVICE FOR INTERRUPTING PRINT JOBS DURING INTERMEDIATE DATA GENERATION

(75) Inventors: Toshihiro Shima, Nagano (JP); Yasunori Hiyoshi, Nagano (JP); Hikonosuke Uwai, Nagano (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/024,197

(22) Filed: Feb. 17, 1998

(30) Foreign Application Priority Data

Feb. 17, 1997 (JP) ............................................. 9-032482
Feb. 2, 1998 (JP) ........................................... 10-020548

(51) Int. Cl.[7] ............................................. G06K 15/00
(52) U.S. Cl. ...................... 358/1.14; 358/2.1; 358/1.15
(58) Field of Search ................................. 395/112, 113, 395/114; 358/1.12, 1.13, 1.14, 1.15, 1.16, 1.17, 1.1–1.9, 2.1

(56) References Cited

U.S. PATENT DOCUMENTS

| | | | | |
|---|---|---|---|---|
| 4,329,046 A | * | 5/1982 | Burkett et al. ................. 355/77 |
| 4,354,672 A | * | 10/1982 | Kulpa et al. ................. 271/221 |
| 4,572,656 A | * | 2/1986 | Buchalter et al. .............. 335/24 |
| 4,624,546 A | * | 11/1986 | Fukushi et al. ................ 399/13 |
| 5,040,019 A | * | 8/1991 | Ito ............................... 355/50 |
| 5,119,472 A | | 6/1992 | Ogawa ....................... 358/1.12 |
| 5,297,376 A | * | 3/1994 | Taguchi et al. ................. 53/55 |
| 5,299,296 A | * | 3/1994 | Padalino et al. ............. 395/113 |
| 5,382,012 A | * | 1/1995 | Mandel et al. ............... 271/296 |
| 5,487,137 A | * | 1/1996 | Matsuhira ................... 358/1.16 |
| 5,550,957 A | * | 8/1996 | Davidson, Jr. et al. ..... 358/1.15 |
| 5,623,675 A | | 4/1997 | Mizuki ........................ 358/1.1 |
| 5,774,356 A | * | 6/1998 | Hisatake et al. ............. 364/152 |
| 5,774,638 A | * | 6/1998 | Kageyama et al. ......... 358/1.15 |
| 5,859,711 A | * | 1/1999 | Barry et al. ................ 358/296 |
| 6,047,111 A | * | 4/2000 | Sugiura et al. ............. 358/1.15 |

FOREIGN PATENT DOCUMENTS

DE 4336500 5/1994

* cited by examiner

Primary Examiner—Gabriel Garcia
Assistant Examiner—King T. Poon
(74) Attorney, Agent, or Firm—Sughrue Mion, PLLC

(57) ABSTRACT

A printing device (1) includes print management means. The print management means interrupts the execution of a print job under execution and executes preferentially another print job waiting for printing: 1) when the print job waiting for printing rather than the print job under execution is first executed, the best order of printing operations is secured or the print mechanism (6) is more efficiently operated, or 2) the processing of the print job under execution takes much time because of time consumption by the intermediate code generation and the like.

31 Claims, 25 Drawing Sheets

| JOB NO. | 1 | 2 | 3 |
|---|---|---|---|
| STATUS INFORMATION A | IN PRINTING | OTHER | WAIT FOR PRINTING |
| STATUS INFORMATION B | 20 | - | 2 |

| TRAY NO. | 7-1 | 7-2 | 7-3 |
|---|---|---|---|
| EMPTY-TRAY MANAGEMENT INFORMATION C | IN USE | NOT IN USE | IN USE |
| EMPTY-TRAY MANAGEMENT INFORMATION D | 1 | - | 2 |

(PRINT REQUEST MANAGEMENT TASK 1)

(PRINT-MECHANISM RETURN INFORMING) SUBROUTINE (TRAY-RETURN INFORMING) SUBROUTINE

*FIG. 19*

| MANAGEMENT INFORMATION F | 3 |
|---|---|
| MANAGEMENT INFORMATION G | 1 |

PRINTER HAVING A PRINT MANAGEMENT DEVICE FOR INTERRUPTING PRINT JOBS DURING INTERMEDIATE DATA GENERATION

BACKGROUND OF THE INVENTION

1. Field of the Invention

The present invention relates to a printing device for printing a plural number of print data in a predetermined order.

2. Related Art

Usually, a conventional printing device is coupled with a data processor in one-to-one correspondence by a local connection. Therefore, it is a common practice that the printing device is provided with one type of connection interface, which is compatible with a data processor to be coupled.

Recent information processing environments require the printing device to be compatible with data processors having different communication interfaces. To satisfy such a requirement, the printing device is quipped with a plural number of input interfaces (referred to as input ports), such as serial ports and parallel ports.

An example of the printing device with a plural number of input ports, conventionally used, is shown in FIG. 28. As shown, a printing device 30 is coupled with four data processors (referred to as host computers) H (H1 to H4) by way of input ports P (P1 to P4). These input ports P(P1 to P4) are provided with buffer memories B (B1 to B4) of given memory capacities, respectively.

In the printing device thus coupled with the host computers, various commands for printing and print data (both being inclusively referred to as print jobs) are input, according to timings shown in FIG. 29, to the printing device through the input ports P thereof, from the host computers H, and stored in the buffer memories B in the printing device. The printing device 30 successively executes and prints the print jobs received from the host computers H1 to H3 in this order. The reason why the execution of the print jobs is thus ordered in the printing device 30 follows: The printing device executes image forming processes in the order of receiving the print jobs at the input ports P, and issues print request commands to a print mechanism (not shown). In this case, upon completion of the processing of the first incoming print job, the printing device executes an image forming process of the next incoming print job, and so on.

Therefore, the printing device cannot carry out the printing based on the next incoming print job till the first incoming print job basis printing ends.

This will be described using an instance illustrated in FIG. 20. As shown, the print jobs coming from the host computers H2 to H4 are ready for printing earlier than the print job from the host computer H1. However, those jobs are placed in wait-for-printing status till the printing process of the job from the host computer H1 ends since the former jobs arrive at the printing device later than the later job. A time taken for processing all the print jobs includes a relatively long waiting time. This leads to an elongation of the total print processing time of the printing device, and makes irritative the operators operating the host computers being put in a wait-for-printing status. This is due to the fact that where one print mechanism is used, the execution of the print jobs following the issuance of a print request command is sequential.

A flow of processings in the printing device, which follows the issuance of a print request, is charted in FIG. 30. A print job issues a print request command (denoted as [1]) for the print job per se; the print job queries as to whether or not the print mechanism is in use (step S01); if the answer is NO (it is not in use) (step S02, NO), it further queries which output tray is to be used (step S03); and if it succeeds in acquiring an output tray for the print job (step S04), it indicates the acquired output tray to the print mechanism (step S05). If failing to acquire the output tray (step S04, NO), the print job directs the print mechanism to set the output tray to a default value and further to shift somewhat to the right or left (step S06). Thereafter, the print job sends intermediate code data of n[1] as the first print unit to the print mechanism and causes it to print (step S07); the print mechanism repeats the printing operations till p1 (total number of prints)=0 (steps S08 to S09); at the end of the printing, the print job abandons the right to use the print mechanism and signals the abandoning of the print-mechanism using right (step S010); and it signals the ending of using the output tray (step S011). If the print mechanism is in use (step S02), the print job repeats the query of the step S01.

Thus, the print request commands are issued in the above order, and the printing operations are performed in the print-request issuing order, sequentially. Therefore, in a case where the first print job has a large number of prints and another print job waiting for printing has a single print, the latter job must wait for printing till the former or first job completes its printing.

SUMMARY OF THE INVENTION

Accordingly, an object of the present invention is to provide a printing device which processes a plural number of print jobs in the best order.

The basic concept of the present invention may be set forth in the form of a printing device comprising:

A) receiving means for receiving the print data of a plural number of printing jobs concurrently;

B) intermediate code generating means for concurrently generating intermediate code data every data unit from on the print data received by the receiving means;

C) a print mechanism for generating bit images on the basis of the intermediate code data and for printing in accordance with the bit images; and D) print management means for executing a predetermined judging process to judge if the print job satisfies a predetermined condition at a predetermined chance during the printing of a print job, for interrupting the processing of the print job under printing on the basis of the result of the judging process execution, for selecting one of print jobs waiting for printing, and for causing the print mechanism to print the selected print job earlier than the remaining print jobs.

When the number of prints in a print job or jobs waiting for printing is smaller than that of the print job under execution of printing, and the difference between the numbers of prints is in excess of a predetermined number of prints, the print management means interrupts the printing operation of the print job under printing.

With this function of the print management means, when the number of prints of the print job waiting for printing is small, the print management means causes the print mechanism to preferentially print the print job waiting for printing.

When a printing-wait time of the print job under printing is longer than a predetermined time, the print management means interrupts the printing operation of that print job.

Therefore, when the printing of the print job under printing is inefficiently performed, the printing of that print job is interrupted and another print job waiting for printing is allowed to start its printing operation. This feature provides an efficient operation of the print mechanism.

The printing-wait time is counted in the range, for example, from the completion of generating a group of intermediate codes of the print job under printing to the generation of another group of intermediate codes.

With this feature, when the print job under printing is waiting for printing, for example, for the reason that the generation of the intermediate codes takes much time, the printing operation of the print job under printing is interrupted, while another print job waiting for printing is executed for printing. The result is to provide an efficient use of the print mechanism.

When a plural number of the print jobs waiting for printing are present, the print management means selects the print job including the smallest number of prints among from those jobs and cause the print mechanism to execute the selected one.

Thus, the print job having a small number of prints is preferentially executed.

When a plural number of the print jobs waiting for printing are present, the print management means selects one from among the print jobs waiting for printing in the order of:

a) print-data reception start times of the receiving means,
b) print-data reception completion times by the same,
c) intermediate-code generation start times by the intermediate code generating means, or
d) intermediate-code generation completion times by the same.

The print management means cause the print mechanism to preferentially print the selected one.

With this feature, the print jobs may be printed in a desired order.

When a print job being interrupted in its printing is included in a plural number of print jobs waiting for printing, the print management means accepts a print request issued from the print job being interrupted in its printing, and causes the print mechanism to preferentially print the print job being interrupted in printing.

Therefore, the print job being interrupted in printing may be executed preferentially.

When interrupting a print job under printing, the print management means designates the print job to next be printed under a predetermined condition.

This feature enables a print job having a small number of prints to preferentially be printed.

When interrupting a print job under printing, the print management means designates the next-but-one print job to be printed under another predetermined condition.

This feature enables another print job having a small number of prints to preferentially be printed.

When interrupting a print job under printing, the print management means designates the print job being interrupted in its printing as the next-but-one print job to be printed.

With this, after interrupted in printing, the print job is preferentially executed for printing.

In printing the next-but-one print job, the print management means compares the number of prints of that print job with that of another print job waiting for printing, and causes the print mechanism to preferentially print the print job waiting for printing under a predetermined condition.

With this, after interrupted in printing, the print job is preferentially printed when the condition is satisfied as the result of comparing the numbers of prints.

The printing device includes a plural number of output trays. The print management means delivers the results of the printing of the print jobs concurrently processed to those output trays.

Therefore, the printing device can concurrently process a plural number of print jobs and deliver the printing results to the output trays concurrently.

The receiving means may include a plural number of input interfaces, and receive the print jobs through the interfaces concurrently.

This feature enables the printing device to concurrently process the plural print jobs received through the input interfaces.

The receiving means may include a network interface, and receive the print jobs through the interface in parallel fashion.

This feature enables the printing device to process the print jobs received through the interface in parallel fashion.

BRIEF DESCRIPTION OF THE DRAWINGS

FIG. 19 is a flow chart showing the structures of management information F and D;

DETAILED DESCRIPTION OF THE PREFERRED EMBODIMENTS

Figure 1:
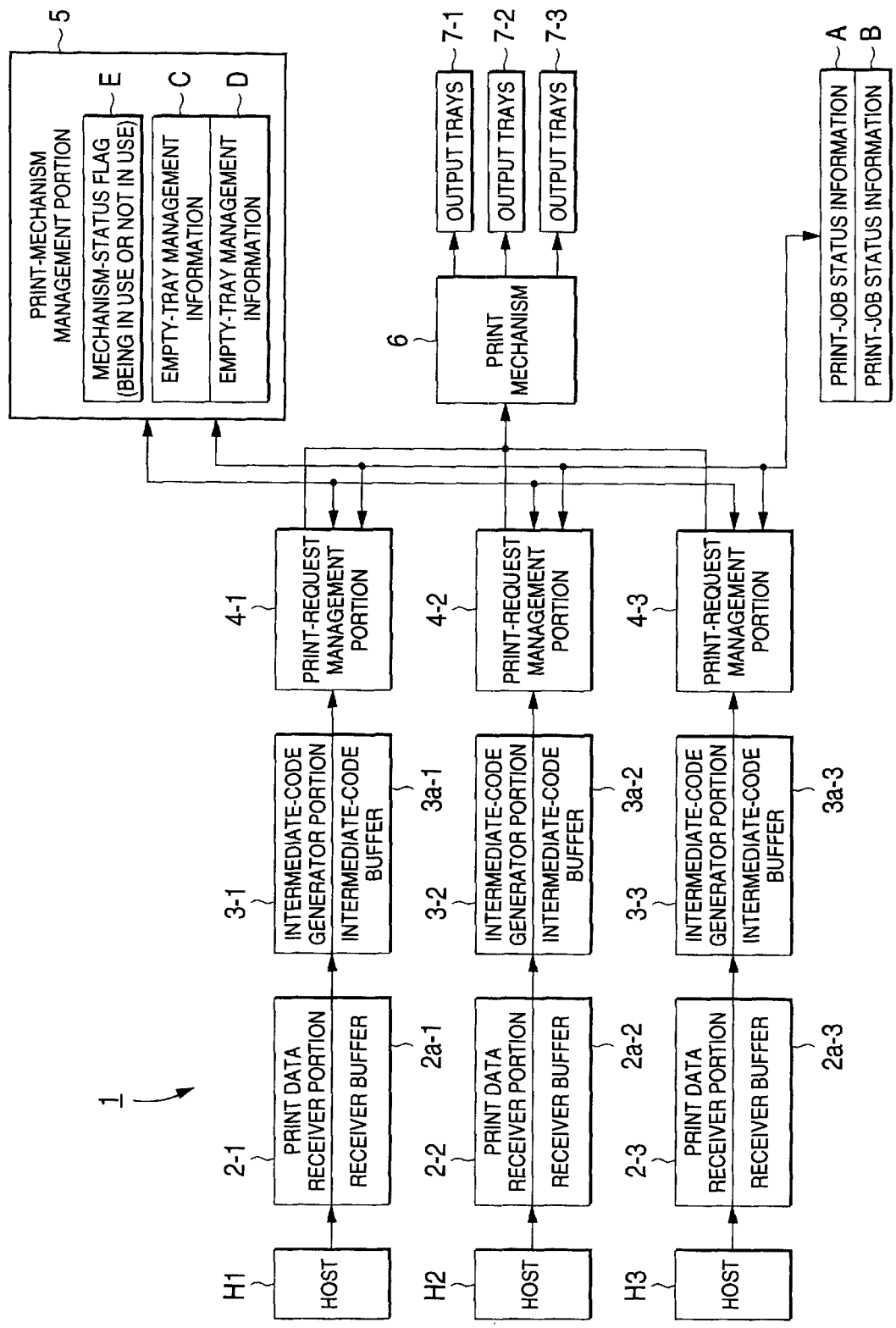
FIG. 1 is a functional block diagram showing a printing device which is a first embodiment of the present invention.

The preferred embodiments of the present invention will be described with reference to the accompanying drawings.
First Embodiment FIG. 1 is a functional block diagram showing a printing device which is a first embodiment of the present invention. As shown, a printing device 1 includes a print data receiver portion 2 (2-1, 2-2, 2-3), a print data storage 2a (2a-1, 2a-2, 2a-3) serving as a print data storage portion and for storing print data received by the print data receiver portion 2, an intermediate-code generator portion 3 (3-1-, 3-2, 3-3), an intermediate-code buffer 3a (3a-1, 3a-2, 3a-3) serving as an intermediate code storage portion and for storing the intermediate code data generated by the intermediate-code generator portion 3, a print-request management portion 4 (4-1, 4-2, 4-3), a print-mechanism management portion 5, a print mechanism 6, and an output tray 7 (7-1, 7-2, 7-3). The print data receiver portion 2, intermediate-code generator portion 3 and print-request management portion 4 are contained in a controller having a microprocessor (CPUs) capable of parallel processing in a time-sharing manner. The microprocessor assigns required functions to those portions and controls the same. A print-request generator for generating a print request corresponding to intermediate code data is provided following the intermediate-code generator portion 3, and an actual image data generating means for generating a bit image (actual image data) as an actual image is followed by the print mechanism 6.

The print data receiver portion 2 receives print jobs (including print data) from the host computers H, and have three input ports, which correspond to the interfaces of the host computers H. A memory area for storing the print job received through each input port is the print data storage 2a. The print data storage area is thus provided for each input port, for ease of the processing in the subsequent stages. One specific storage area of the receiver buffer 2a may be provided and used commonly for those input ports, as a matter of course.

When a given image forming process is executed according to the print job, the intermediate-code generator portion 3 (3-1 to 3-3) converts the print data of the print job into intermediate codes or intermediate code data. The intermediate code data is composed of position information for individual print data and image information at the positions defined by the position information. Examples of the image information are bit map data for characters, configuration data for graphics, and image data for photograph. The print data is converted into the intermediate code data for the reasons that 1) if the print data is directly converted into real image data, the image forming process is complicated and takes much time for its execution, and 2) the intermediate code data is usually smaller in size than the real image data in storing the data. The intermediate code data thus generated is developed or compressed into real image data by the real image generating means, and the resultant intermediate code data is stored till a related instruction is issued from the print mechanism 6.

The print-request management portion 4 (4-1, 4-2, 4-3) manages the print requests generated for the intermediate code data generated by the related intermediate-code generator portion 3, and issues the print requests in a given to toward the print mechanism 6.

Figures 2, 3, 4:
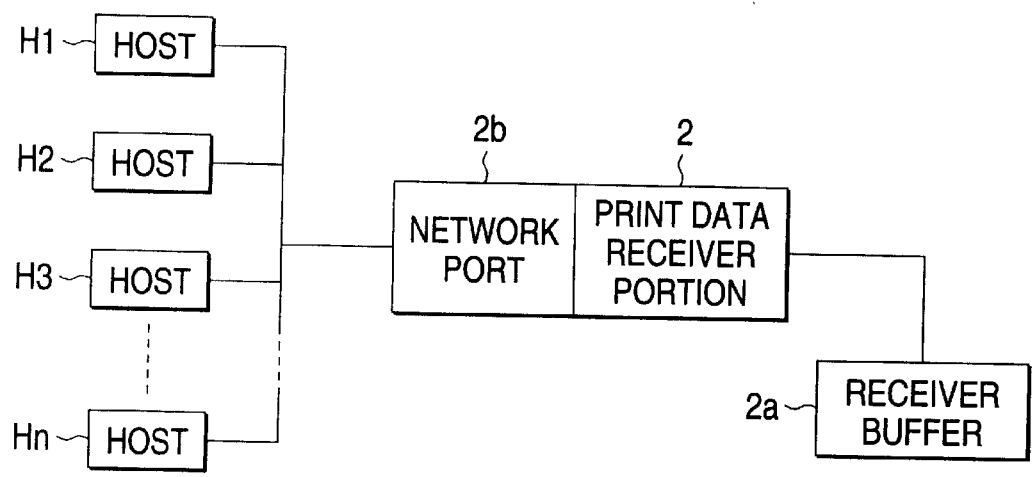
FIG. 2 is a functional block diagram showing a modification of the first embodiment of the present invention.
FIG. 3 is a table showing the structures of status information A and B.
FIG. 4 is a table showing the structures of status information C and D.

In the present embodiment, each print-request management portion 4 has judging information for each print job. The judging information is used for predetermined judgements, and consists of status information A and another status information B, both being indicative of statuses of the print jobs. The status information A and B have structures as shown in FIG. 3, and are stored in a RAM, for example. As shown, the status information A indicates three statuses of the print jobs 1 to 3 received from the host computers H1 to H3; an under-printing status, a wait-for-printing status, and other status. The status information B indicates the numbers of prints not yet printed in the print jobs 1 to 3 in the statuses of those jobs. The Table of FIG. 3 shows that the print job 1 is in an under-printing status, and contains 20 number of prints not yet printed, and that the print job 3 output from the third host computer H3 is in a wait-for-printing status, and contains a total number of prints to be printed. A storage area for storing the status information A and B provided for each print job may be secured in advance in the memory, e.g., RAM, or may be secured every time each of the print jobs 1 to 3 appears.

The print-mechanism management portion 5 manages statuses of the print mechanism 6. When the print mechanism 6 is in operation, the print-mechanism management portion 5 sets a flag E to "1". Further, the print-mechanism management portion 5 manages empty-tray management information C and D, both being indicative of empty-information of the output trays 7. The empty-tray management information C and D have structures as tabulated in FIG. 4. The empty-tray management information C indicates that the first to third output trays 7-1 to 7-3 are in use or not in use. The empty-tray management information D indicates the print-request management tasks which use the output trays 7. The table of FIG. 4 shows that the first output tray 7-1 is being used by a print-request management task 1, the second output tray 7-2 is not used, and the third output tray 7-3 is being used by a print-request management task 2. The flag E, and the empty-tray management information C and D are stored in a specific storage area of a RAM, for example. The storage area may be secured in advance or when it is necessary.

The print mechanism 6 containing a digital engine (not shown) acquires the real image data corresponding to the intermediate code data in the order in which the print mechanism accepts print requests issued by the print-request management portion 4, and prints the image data on printing media or papers in the same order.

The output trays 7 are for receiving the results of printing that is performed according to one or more print data (three print data in the illustrated embodiment), which are output from the print mechanism 6.

In the embodiment under discussion, the print data receiver portion 2 includes three input ports, which are respectively provided in association with the host computers H (H1 to H3). Instead of the plural number of input ports, a single network port 2b and the parallel-processing microprocessor may be used for coupling the print data receiver portion 2 with a plural number of host computers H1 to Hn, whereby print jobs and print data associated therewith are received in parallel from the host computers (FIG. 2). The printing device thus constructed operates such that when the printing device, when receiving print data from a host computer, receives print data from another host computer, the CPUs operate in time-sharing manner to receive the print data under control of an operating reception program. Thus, the printing device receives the print data as if the print data receiver portion 2 is equipped with a plural number of input ports.

In either printing device, a plural number of data reception processes are concurrently carried out to receive print jobs and print data associated therewith from the host computers H.

Figure 5:
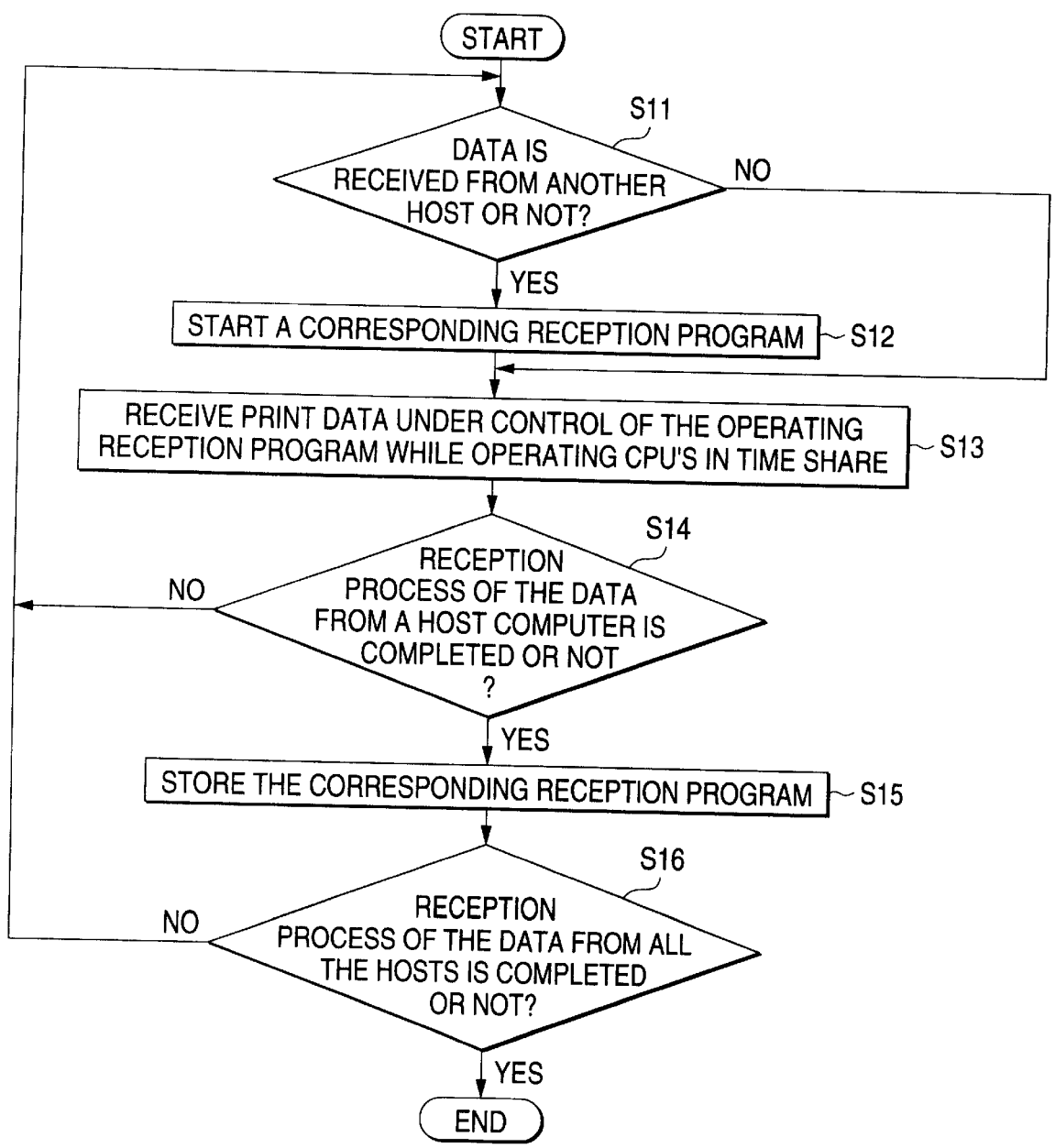
FIG. 5 is a flow chart showing a print-data reception process used by the first embodiment and other ones of the invention.
Figure 6:
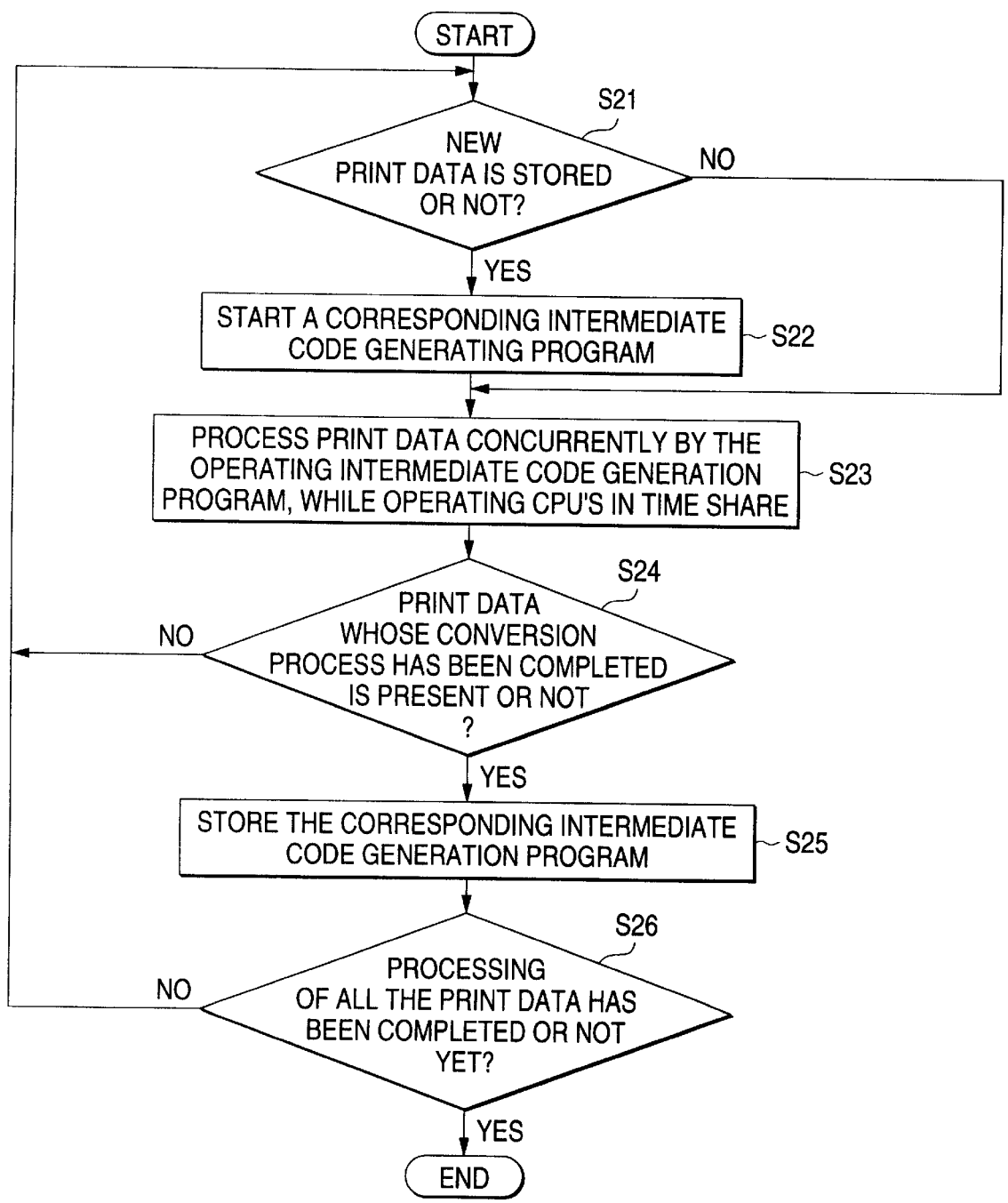
FIG. 6 is a flow chart showing a process for converting print data into intermediate code data.

An example of a procedure for receiving print jobs and their associated print data in parallel from a plural number of host computers is flow charted in FIG. 5.

In the flow chart shown in FIG. 5, when the printing device currently receiving print data from a host computer, receives print data from another host computer, viz., a reception request for a print job and their associated print data is issued (step S11, YES), the print data receiver portion 2 starts a corresponding reception program (step S12), and receives the print data in parallel under control the operating reception program, while operating the CPUs in time share (step S13). The received print data are stored in the related print data storages 2a as the print data storage portions. When the print data receiver portion 2 completes the data reception process of the data received from a host computer (step S14, YES), the print data receiver portion 2 stops the operation of the corresponding reception program and stores it (step S15). The print data receiver portion 2 performs the sequence of the operations for all the host computers. The print data receiver portion 2 ends the execution of the data reception process when it has received the print data from all the host computers (step S16, YES).

If during the generation of the intermediate code data from the print data, another print data is stored in the print data storage 2a, viz., an intermediate code generation request for the print data is issued (step S21, YES), the intermediate-code generator portion 3 starts a corresponding intermediate code generation program (related to the print data stored anew) (step S22), and concurrently performs the conversion processes of the new print data and the old print data (already under the conversion processing) as well into intermediate code data by use of the currently operating intermediate code program. When the conversion processing ends (step S24, YES), the intermediate-code generator portion 3 stores the corresponding intermediate code generation program into the intermediate-code buffer 3a associated therewith (step S25). A sequence of the operations mentioned above is executed for all the print data, and when the conversion of all the print data into the intermediate code data is completed (step S26, YES), the intermediate code generating process ends.

The wording "to start a corresponding program" (steps S12, S22) is used in the description of the parallel data reception process and the parallel intermediate code generation process. The wording is used in the following situation: a data reception program or an intermediate code generation program is stored in the ROM; the program is being executed while referring to the ROM; the program is copied onto the RAM; it is executed while referring to the RAM; the programs are concurrently executed while referring to both the ROM and RAM in time share.

The wording is also used in the following situation: the data reception program and the intermediate code generation program stored in the ROM, for example, are of the reentrant type; when occasion demands, a plural number of processings may be executed in a time-sharing manner.

The first to third print data receiver portions 2-1 to 2-3, and the first to third intermediate-code generator portions 3-1 to 3-3, which are illustrated in FIG. 1, are for showing those situations in the form of models. Those portions 2-1 to 2-3, and 3-1 to 3-3 correspond respectively to the tasks that may be executed in parallel. The number of those portions, i.e., three number of those portions, is merely illustrative and not restrictive, as a matter of course.

In the present embodiment, the print-request management processes, which are executed by the first to third print-request management portions 4-1 to 4-3, are also executable in parallel, and those portions 4-1 to 4-3 correspond to the tasks executable in parallel, respectively.

The print data receiver portion 2, intermediate-code generator portion 3, print-request management portion 4, and print-mechanism management portion 5 concurrently execute their tasks through a time-sharing control of the CPUs in the controller. The tasks are priority ordered in their executions; those tasks are alternately executed for each time unit of several msec in this order. A real time monitor as a set of programs to be executed for 1 msec or shorter selects the task to which the right to use the CPU is to be transferred from among those tasks, while referring to the priority order and others. Flows of processings in the processes, which are used in the embodiment under discussion, will be described hereinafter.

A print-data reception task for processing the reception of the print data and an intermediate code generation task for converting the received print data into intermediate code data will be described with reference to related flow charts. The printing device of the present embodiment uses three print-data reception tasks 1 to 3 corresponding to the first to third print data receiver portions 2-1 to 2-3 (FIG. 1), and three intermediate code generation tasks 1 to 3 corresponding to the first to third intermediate-code generator portions 3-1 to 3-3 (FIG. 1). The tasks 1 will be described typically, for ease of explanation.

Figure 7:
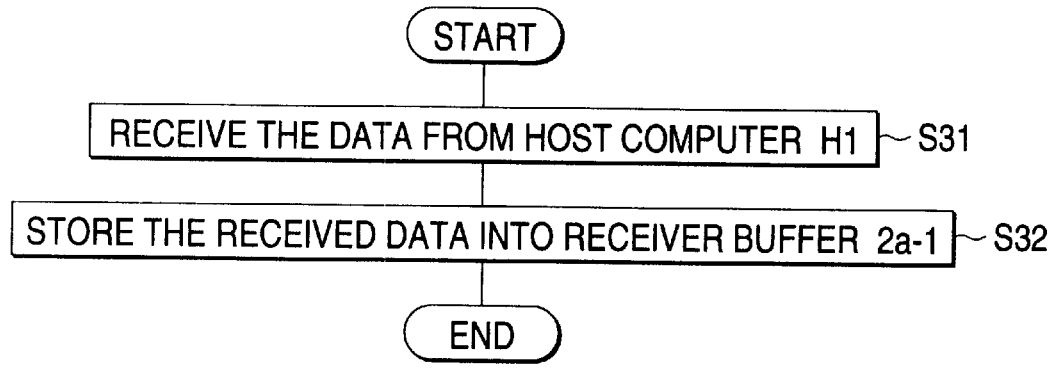
FIG. 7 is a flow chart showing a print-data reception process.

A processing flow of the print-data reception task 1 is charted as shown in FIG. 7. The controller of the printing device receives print data from the host computer H1 (step S31), and stores the received data into the first receiver buffer 2a-1 (step S32).

Figure 8:
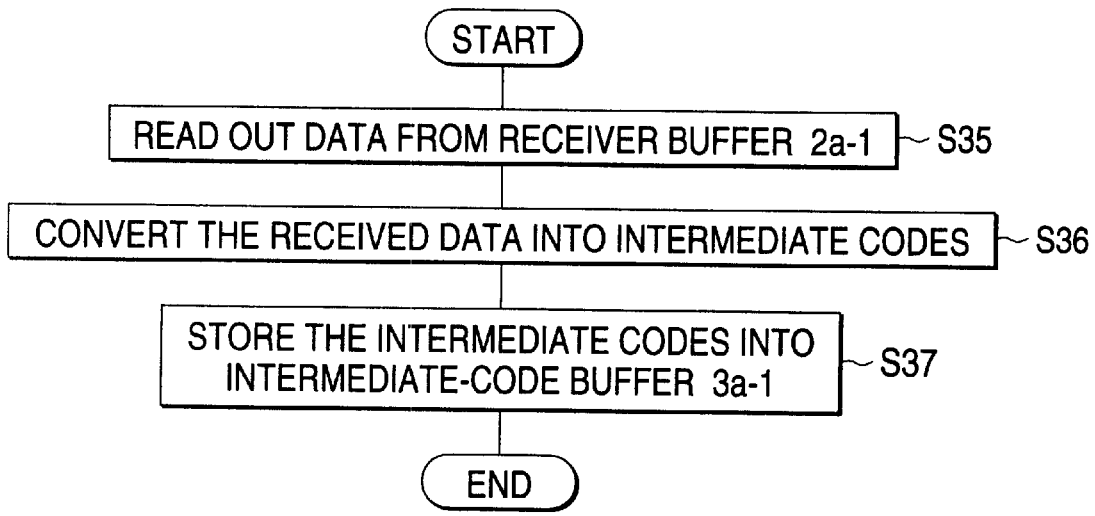
FIG. 8 is a flow chart showing an intermediate code generation task.

A processing flow of the intermediate code generation task 1 is charted as shown in FIG. 8. The controller reads out the print data from the first receiver buffer 2a-1 (step S35); it converts the readout data into intermediate code data (step S36), and stores the thus converted or generated intermediate code data into the first intermediate-code buffer 3a-1 (step S37).

Print request generating means (not shown) generates print requests, which correspond to the thus generated intermediate code data, usually in the order of receiving the print data or a priority order determined by priority order determining means (to be described later). The present embodiment uses the print-request management portion 4 and the print-mechanism management portion 5 for print management means for securing the printing operations in response to the thus generated print requests in predetermined procedural steps.

A print-request management task processed by the print-request management portion 4 will be described with reference to FIGS. 9 and 10. As recalled, the printing device of the present embodiment uses the three print-request management portions 4-1 to 4-3, and hence, three print-request management tasks, first to three ones, 1 to 3. In the description to follow, the print-request management task 1 to be processed by the first print-request management portion 4-1 will be typically described. Upon generation of a print request, a wait-for-printing status is input or entered to the status information A[1] for the print job 1 (step S41), a total number of prints is entered to the status information B (step S42). And the first print-request management portion 4-1 issues a print-mechanism acquisition request to the print-mechanism management portion 5 to query as to whether or not the print mechanism 6 is in operation (step S43). The print-mechanism acquisition request is for calling a subroutine to be described later.

If the first print-request management portion 4-1 fails to acquire the print mechanism 6 (step S44, NO), the first print-request management portion 4-1 returns to the step S43. If succeeding in acquiring the print mechanism 6 (step 44, YES), it enters an "under-printing status" to the status information A[1], and then issues a tray acquisition request to the print-mechanism management portion 5 to query as to which tray the result of the printing is output (step S46). The tray acquisition request is a command to call a subroutine (to be described later).

If succeeding in acquiring the output tray (step S47, YES), the first print-request management portion 4-1 shows the output tray for the print mechanism 6 on the basis of the query result (step S48). If failing to acquire the same (step S47, NO), the first print-request management portion 4-1 directs the print mechanism 6 to set the output tray to a default value, and at the same time directs the print mechanism 6 to shift the output position slightly to the left or right (step S49).

Then, the first print-request management portion 4-1 sends the intermediate code data of n[1] page as the print unit to the print mechanism 6; in turn it prints the intermediate code data (step S50 in FIG. 10)); and it enters (B[1] −n[1]) to the status information B[1] indicative of the number of print pages not yet printed (step S51). If B[1] is not 0 (step S52, NO), the printing operation is repeated. If B[1] is 0 (step S52, YES), the printing operation ends.

If B[1] is not 0 in the step S52, the first print-request management portion 4-1 judges whether or not the status information A[2] of another print job is in a wait-for-printing status (step S53). If the answer is NO, the first print-request management portion 4-1 further judges whether or not the status information A[3] corresponding to yet another print job is in a wait-for-printing status (step S54). If the answer is YES (wait-for-printing status) in the step S53, the first print-request management portion 4-1 judges, in step S55, whether or not the total number of print pages not yet printed or waiting for their printing is much small than the number of pages under the execution of printing but not yet printed (B[1]/m≧B[2])). Here, m is a coefficient used for judging whether or not B[2] is sufficiently smaller than B[1], and the coefficient is represented by a number of two digits, for example. If the status information A[3] is in a wait-for-printing status in the step S54, the first print-request management portion 4-1 judges, in step S56, whether or not the total number of print pages waiting for their printing is sufficiently small than the number of pages under printing but not yet printed (B[1]/m≧B[3])). If the answer is YES (step S55, S56, YES), the first print-request management portion 4-1 signals the abandoning of the right to use the print mechanism 6 to the print-mechanism management portion 5 (step S57); it enters the wait-for-printing status to the status information A[1] (step S58); and it returns to the step S43. Incidentally, the step S57 is for calling a print-mechanism return informing subroutine (to be described later).

Figure 11:
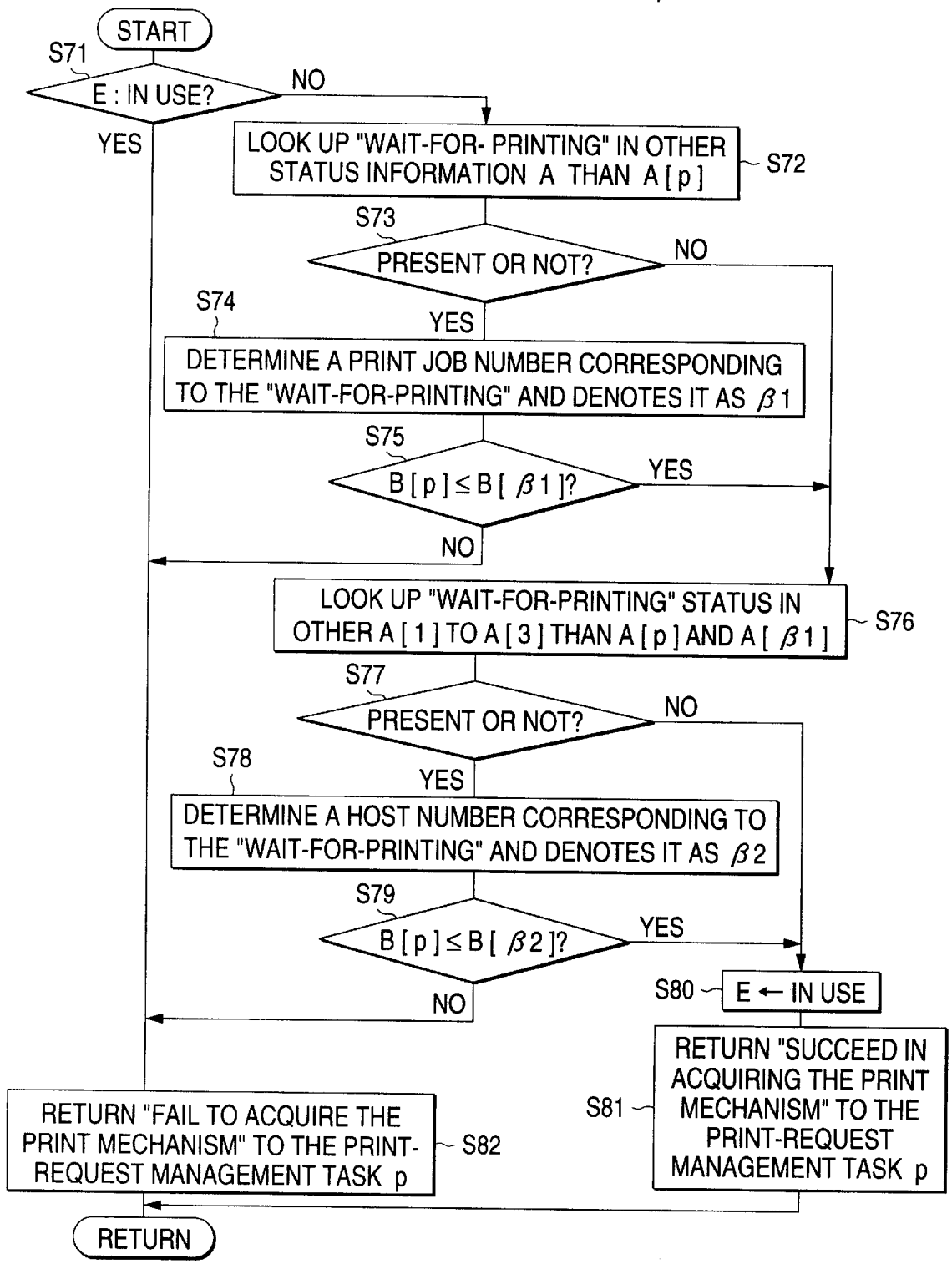
FIG. 11 is a flow chart showing a print-mechanism acquisition request subroutine.

If the status information B[1] is 0 and the printing operation ends in the step S52, the first print-request management portion 4-1 sends a command of the abandoning of the right to use the print mechanism 6) or a command of the print-mechanism return, to the print-mechanism management portion 5 (step S59); then it sends a "tray return" (the end of using the output tray) to the print-mechanism management portion 5 (step S60); and it enters "other status" to the status information A[1] and ends the execution of the process (step S61). Incidentally, the step S59 is for calling the print-mechanism return informing subroutine (to be described later), and the step S60 is for calling a tray-return informing subroutine (to be described). FIG. 11 is a chart showing a processing flow of the print-mechanism acquisition request subroutine called by the step S43 (FIG. 9). As shown, the first print-request management portion 4-1 judges whether or not a mechanism-status flag E (indicative of whether the print mechanism 6 is in use or not in use) is in a "being in use" state (step S71); if the answer is YES (step S71, YES), it returns a message "fail to acquire the print mechanism" to a print-request management task p having issued a print request (p: the number of the print-request management task having issued a print request command, and it is 1 in this instance) (step S82).

If the print mechanism 6 is not in use (step S71, NO), the first print-request management portion 4-1 judges whether another print-request management task (or tasks) being waiting for printing is present or not, through the following processing steps. In this case, if such a task is present and the number of print pages of the other task is smaller than that in the print-request management task being currently executed, the first print-request management portion 4-1 (being engaged in executing its task) transfers the right to use the print mechanism 6 (referred frequently as a print-mechanism using right) to the print-request management task waiting for printing. More specifically, the first print-request management portion 4-1 looks up "wait-for-printing" in other status information A[1] to A[3] than the status information A[p] (step S72); if it finds the "wait-for-printing" (step S73, YES), it determines a print job number corresponding to the "wait-for-printing" and denotes it as β1 (step S74); it judges if the status information B[1] indicating the number of print pages not yet printed in the print-request management task is larger than the status information B[p] of the print-request management task now issuing a print request command; and if the answer is NO (step S75, NO), it returns a message "fail to acquire the print mechanism" to the print-request management task p so that the print-mechanism using right is transferred to the print-request management task of β1 (step S82). If the answer is NO (B[β1]>B[p]) (step S75, YES), the first print-request management portion 4-1 looks up "wait-for-printing" in other status information A[1] to A[3] than the status information A[p] and A[β1] (step S76); if it finds the "wait-for-printing" (step S77, YES), it determines a print job number corresponding to the "wait-for-printing" and denotes it as P2 (step S78); it judges if the status information B[β2] is larger than the status information B[p]; and if the answer is NO (step S79, NO), it returns an "unable to acquire the print mechanism" to the print-request management task p so that the print-mechanism using right is transferred to the print-request management task of β2 (step S82). If the answer is YES (B[β2]<B[p] (step S79, YES), the first print-request management portion 4-1 sets the mechanism-status flag E to a state of "in use" (step S80); and it returns a "succeed in acquiring the print mechanism" to the print-request management task p (step S81). In the process mentioned above, the number of the other print-request management tasks (than the print-request management task for the first print-request management portion 4-1) is two (2). If it is 3 or larger, the sequence of the processings of the steps S72 to S75 is further repeated correspondingly.

Figure 9:
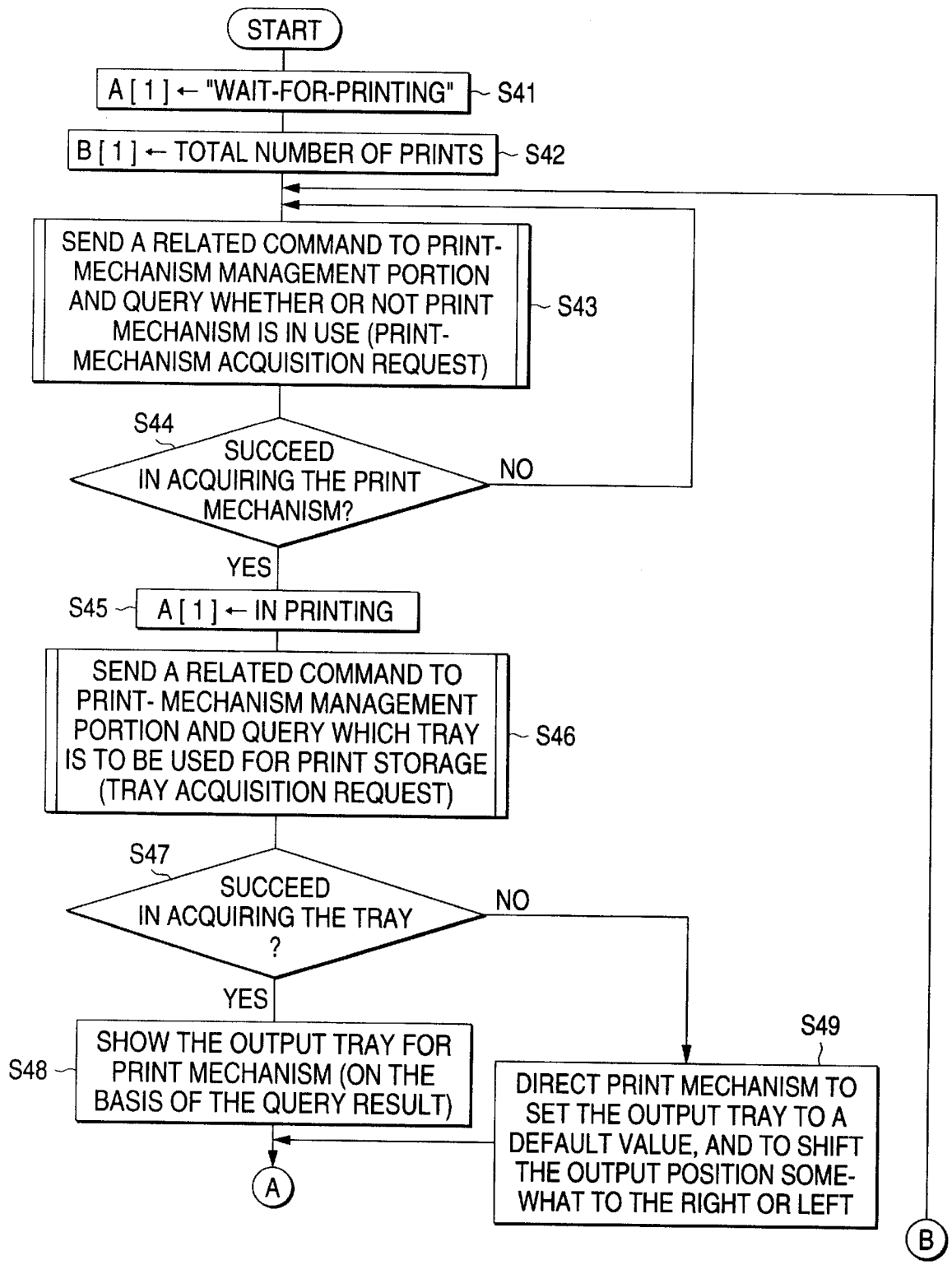
FIG. 9 is a flow chart showing a print-request management task.
Figure 12:
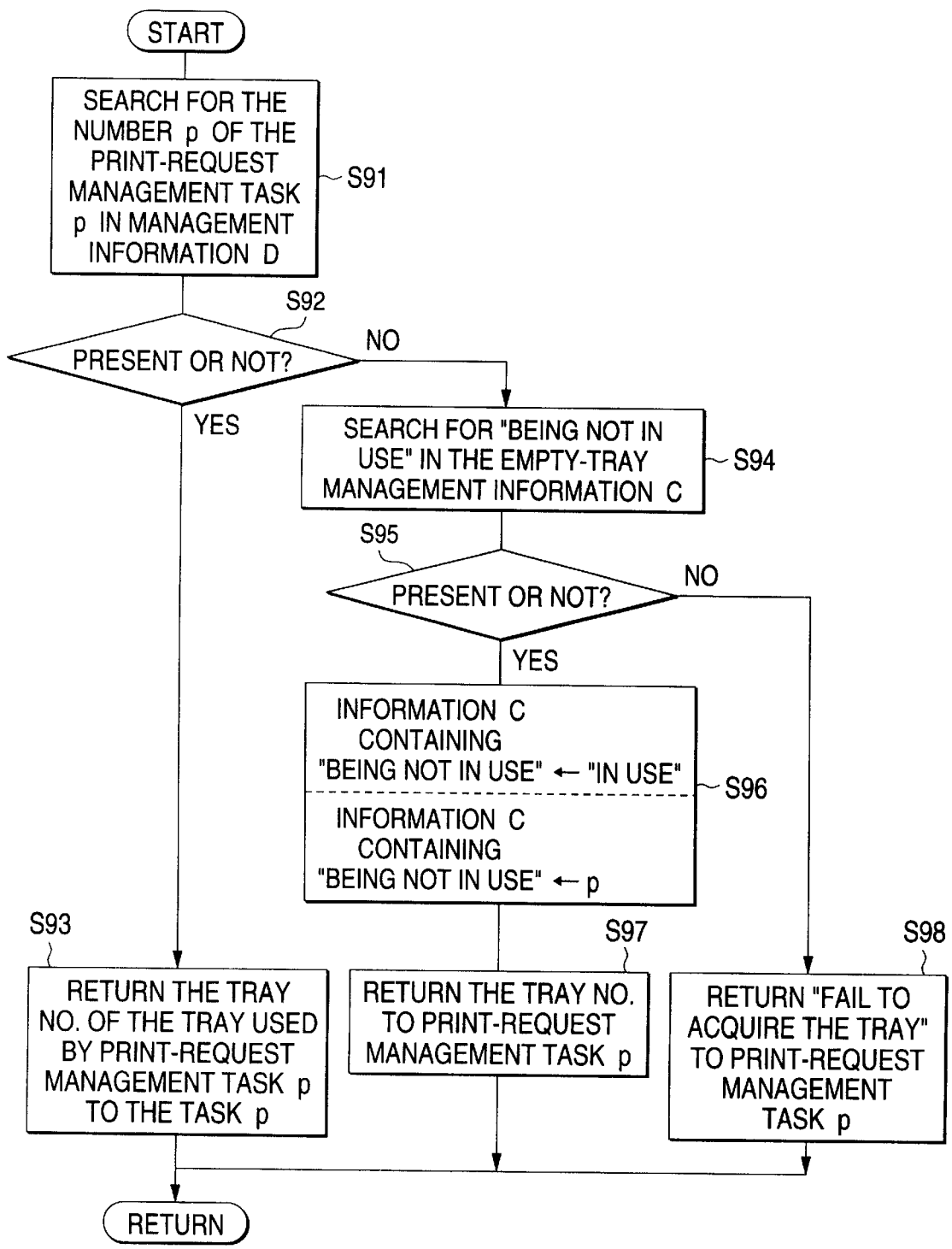
FIG. 12 is a flow chart showing a tray acquisition request subroutine.

Turning now to FIG. 12, there is charted a flow of processings of a tray acquisition request subroutine that is called in the step S46 (FIG. 9). As shown, the first print-request management portion 4-1 searches for the number p of the print-request management task p now issuing a tray acquiring command in management information D indicative of the number of the print-request management task currently using an output tray (step S91). If the output tray being used is present (viz., the number "p" of the print-request management task currently using the output tray is present) (step S92, YES), the first print-request management portion 4-1 returns the number of the output tray being used by the print-request management task to the print-request management task p issuing a print request command (step S93). If the output tray being used is absent (step S92, NO), the first print-request management portion 4-1 searches for "being not in use" in the empty-tray management information C indicating statuses of the output trays, being in use or not in use (step S94). If "being not in use" is found (step S95, YES), the first print-request management portion 4-1 enters "being in use" to the empty-tray management information C; it enters "p" to the management information D indicative of the number of the print-request management task currently using an output tray (step S96); and further returns the number of the found empty output tray to the print-request management task p (step S97). If the empty output tray is not present (step S95, NO), the first print-request management portion 4-1 sends a message "fail to acquire the tray" to the print-request management task p (step S98).

Figure 10:
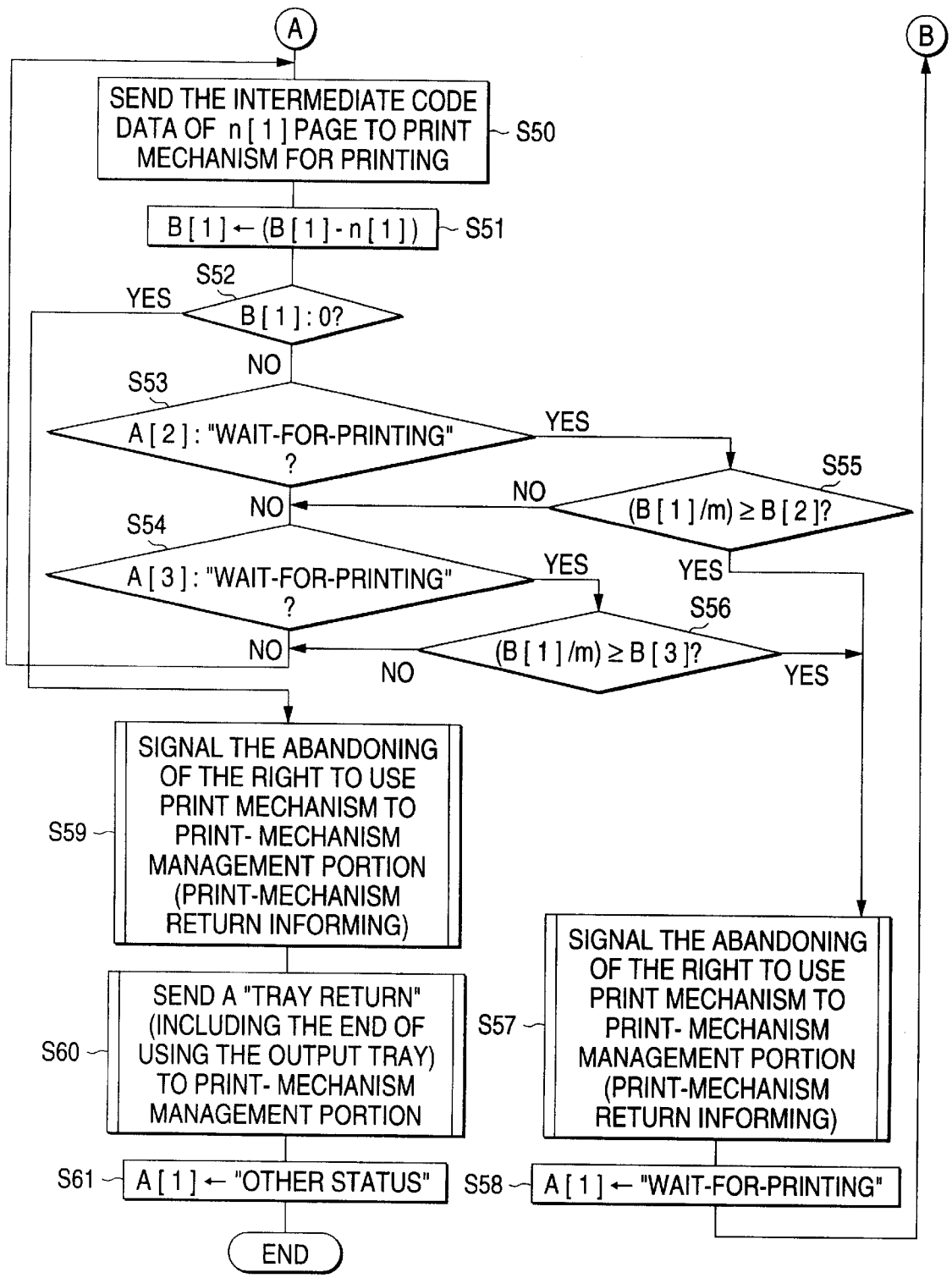
FIG. 10 is a flow chart showing an another part of the print-request management task shown in FIG. 9.
Figure 13:
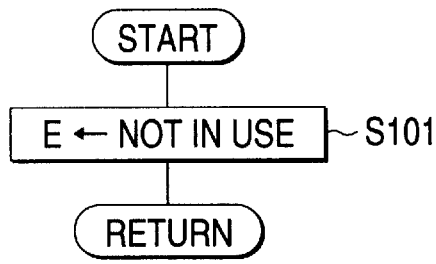
FIG. 13 is a flow chart showing a print-mechanism return informing subroutine.

FIG. 13 is a flow chart showing a print-mechanism return informing subroutine (steps S57 and S59 in FIG. 10). This routine is used for setting the mechanism-status flag E to a state of "being not in use" (step S101).

Figure 14:
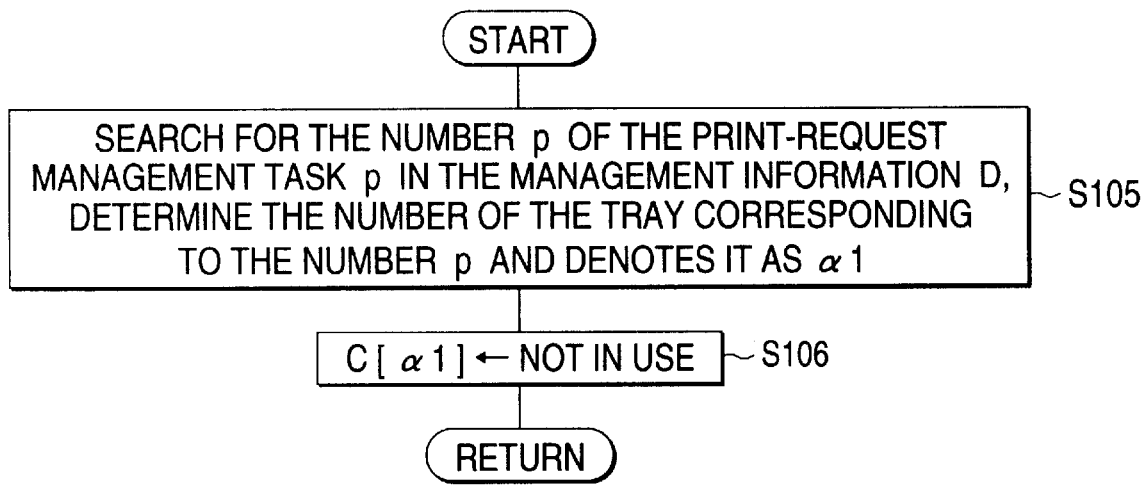
FIG. 14 is a flow chart showing a tray-return informing subroutine.

FIG. 14 is a flow chart showing a tray-return informing subroutine (step S60 in FIG. 10). The subroutine searches for the number p of the print-request management task p in the management information D; it determines the number of the output tray corresponding to the number p and denotes it as α1 (step S105); and it enters "being not in use" to the management information C[α1] corresponding to the number α1 (step S106).

The printing device of the first embodiment having thus far described operates in the following way. During the printing operation by the print-request management task 1, if the number of print pages of the print job being waiting for printing is much small than that of the print job being currently executed by the first print-request management portion (steps S53 and S55 in FIG. 10), the first print-request management portion (being engaged in executing its task) abandons the right to use the print mechanism, and transfers it to the print-request management task waiting for printing. After the abandoning of the print-mechanism using right, the print-request management task waiting for printing issues a print-mechanism acquisition request command; the sequence of the processings of steps S72 to S79 (FIG. 11) is executed; and the print-mechanism using right is transferred to the print-request management task having the smallest number of print pages through the processing sequence. Thus, the print job including a small number of prints is preferentially processed. The same thing is correspondingly applied to a case where a plural number of print-request management tasks are waiting for printing at the end of the processing of the print-request management task 1.

In a situation where when the print-request management portion judges that the print-request management task including a small number of prints is waiting for printing and abandons the right to use the print mechanism, it rarely happens that a plural number of print-request management tasks are waiting for printing, the judgement through the steps S72 to S79 is not essential. The same beneficial effect can be obtained in the embodiments of the invention that will subsequently be described. An example of processing flow in the printing device of the first embodiment is charted in FIG. 15. In the figure, the printing device first receives the print data from the second host computer H2 and executes the print data reception task 2, and successively the intermediate code generation task 2 and the print-request management task 2. Then, the printing device receives print data from the first host computer H1, and successively executes the print data reception task 1, the intermediate code generation task 1 and the print-request management task 1. During the execution of the tasks 1, the printing device receives the print data from the third host computer H3, and successively executes the print data reception task 3, the intermediate code generation task 3 and the print-request management task 3. And the print-request management task 3 has a wait-for-printing status (X1). In this situation, the conventional printing device continues the wait-for-printing status (X1) till the printing of the print-request management task 1 ends. On the other hand, in the printing device of the invention, the print-request management task 1 judges that the number of prints in the print-request management task 3 is smaller than that in the print-request management task 1, and temporarily abandons the print-mechanism using right and transfers it to the print-request management task 3 (X2). The print-request management task 3, when its printing ends, abandons the right to use the print mechanism, while at this time, the print-request management task 2 is also in a wait-for-printing status (X3). In this case, the print-request management task 3 compares the number of prints of the print-request management task 1 with that of the print-request management task 2, and transfers the print-mechanism using right to the print-request management task 2 of which the number of prints is smaller than that of the print-request management task 1 (X4). In this case, the following modification is allowed: information of "printing being interrupted" is added to the status information A; and the print-request management task being interrupted in its printing preferentially acquires the right to use the print mechanism 6.

In the above-mentioned embodiment, when a plural number of print-request management tasks are waiting for printing, the print-request management task having the smallest number of prints is selected from those tasks, and top priority is given to the selected one in the task execution order. The task execution order may be any of the orders of; the print-job reception start times of the print job receiver portion 2, the print-job reception completion times by the same, the intermediate-code generation start times by the intermediate-code generator portion 3, the intermediate-code generation completion times by the same; and the like.

Second Embodiment

A second embodiment of the present invention will be described. In this embodiment, when a print-request management task under execution judges that another print-request management task having a smaller number of prints is waiting for printing, and abandons the print-mechanism using right, the print-request management task designates the print-request management task to which the print-mechanism using right is to be transferred. By so doing, the print job having a small number of prints is preferentially executed during the execution of the print job having a large number of prints. Also in the second embodiment, when a print-request management task (first task) temporarily stops its printing and transfers the right to use the print mechanism to another print-request management task (second task), the first retakes the print-mechanism using right after the second task completes its printing. To this end, when the first task transfers the right to the second task, the first task designates the first task itself as the next-but-one task to which the right is to be transferred.

Figure 16:
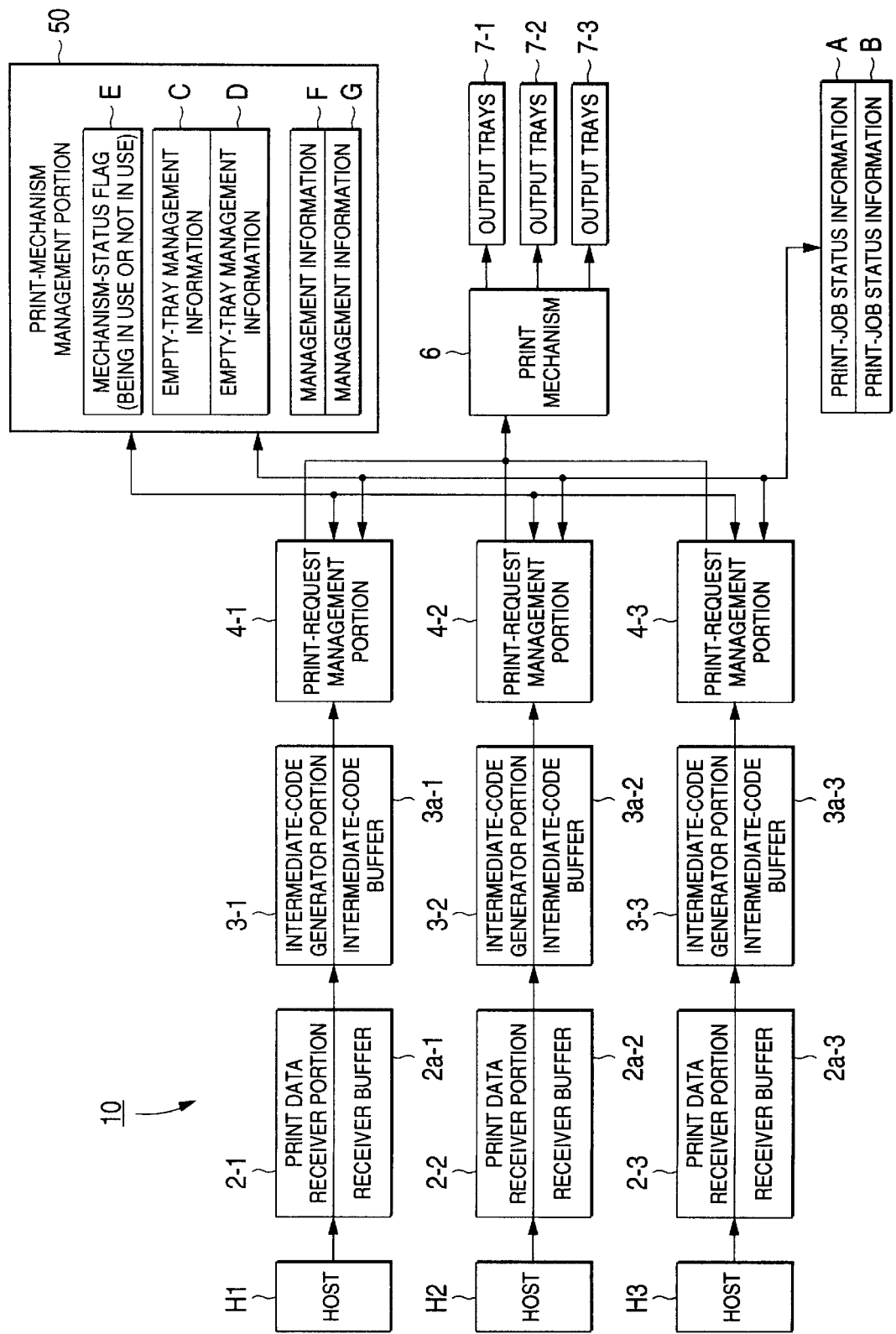
FIG. 16 is a functional block diagram showing a printing device which is a second embodiment of the present invention.

FIG. 16 is a functional block diagram showing a printing device which is the second embodiment of the present invention. In the printing device 10 of the second embodiment, a print-mechanism management portion 50 includes management information F and G, in addition to the flag E and the management information C and D. The management information F indicates the number of the next print-request management task to which the right to use the print mechanism is to be transferred, and the management information G indicates the number of the next-but-one print-request management task to which the right is to be transferred. The management information F and G are set when the print-request management task temporarily abandons the print-mechanism using right, and it is referred to by the print-mechanism acquisition request subroutine. In the subroutine, the print-mechanism using right is transferred to the print-request management tasks according to the management information F and G, and those pieces of information, after unnecessary, are reset. When the task to which the print-mechanism using right is transferred is not designated, 0s are set in the management information F and G. The management information F and G, like the management information C and D, are stored in predetermined locations in a RAM, for example. Those memory locations may be secured in advance or when occasion demands.

The print data reception task, intermediate code generation task and print-request management task in the second embodiment are substantially the same as those in the first embodiment, but the print-request management task and the print-mechanism acquisition request subroutine are somewhat different in their processing from those in the first embodiment.

Figure 17:
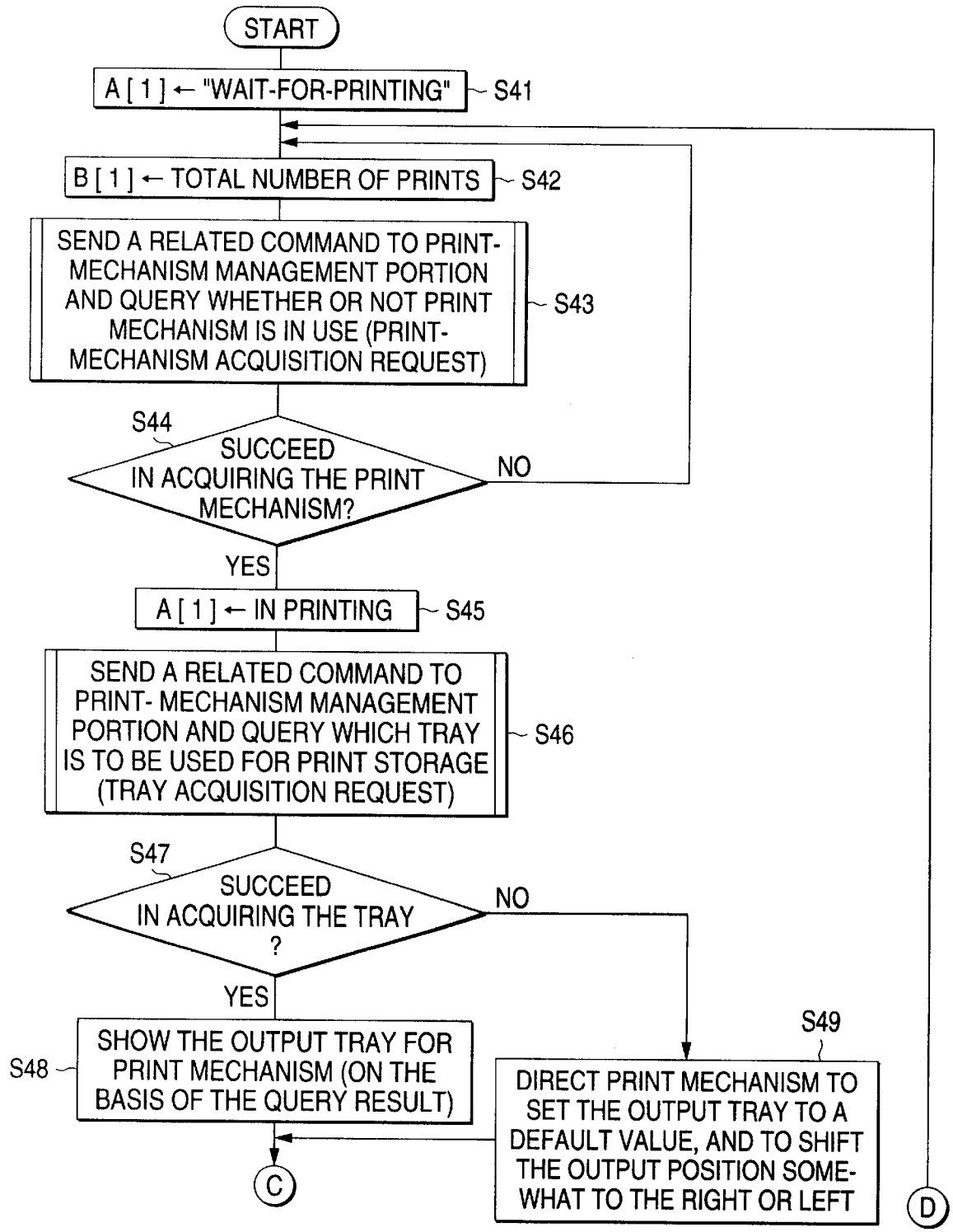
FIG. 17 is a flow chart showing a print-request management task.
Figure 18:
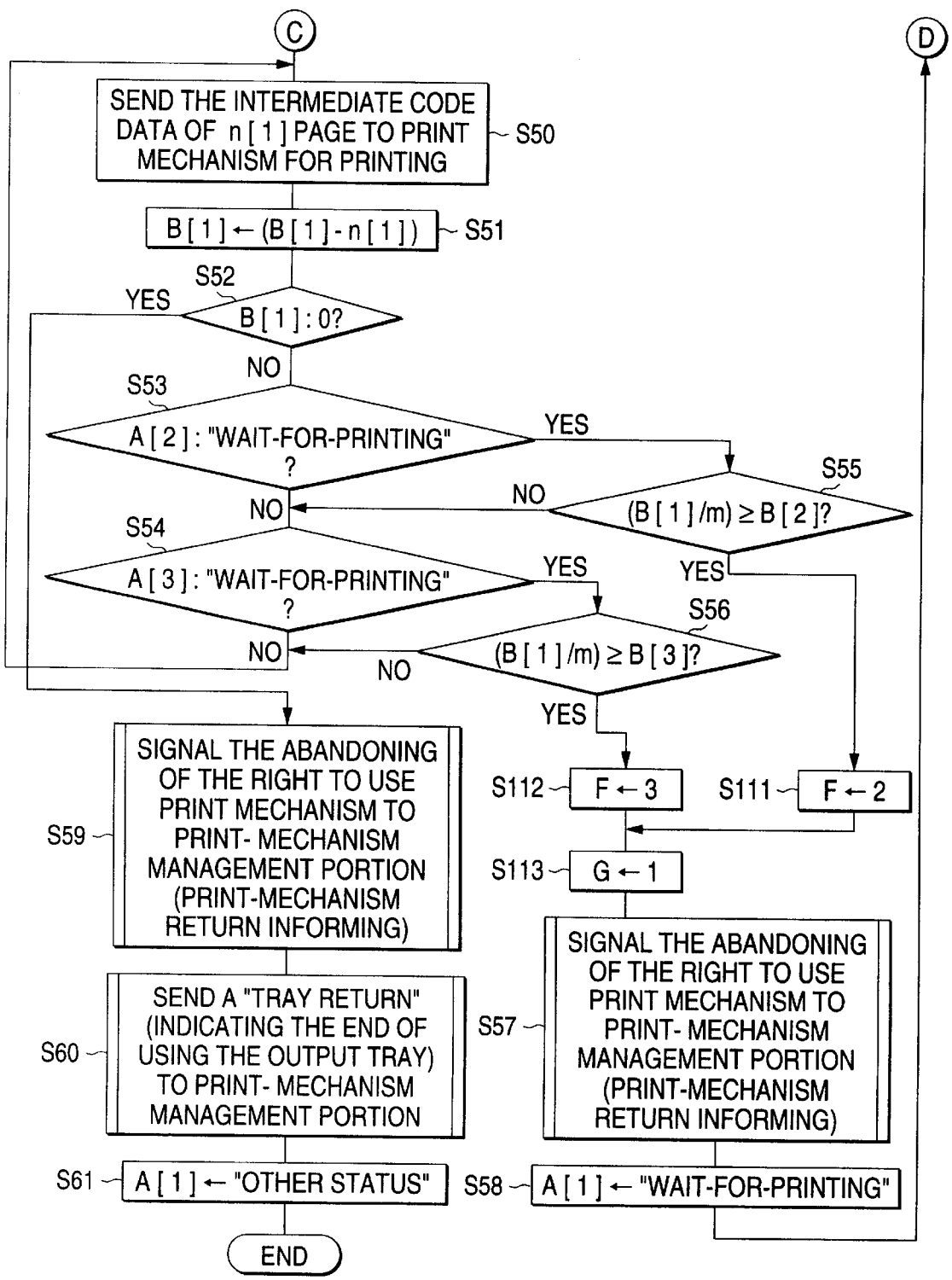
FIG. 18 is a flow chart showing another part of the print-request management task shown in FIG. 17.

FIGS. 17 and 18 cooperate to show a processing flow of the print-request management task 1. In those figures, like or equivalent portions are designated by like reference numerals in FIGS. 9 and 10.

The print-request management task 1 under execution judges whether or not another print-request management task waiting for printing is present (step S53, S54). If such a task is present and the print-request management task 1 judges that the number of prints of the waiting print-request management task is smaller than that of the print-request management task 1 (step S55, S56, YES), the print-request management task 1 enters the number "2" or "3" of the print-request management task which waits for printing and to which the right to use the print mechanism is transferred, to the management information F (step S111, S112). In step S113, the print-request management task 1 enters the number "1" of the task 1 itself to the management information G so as to retake the print-mechanism using right after the ending of the printing of the print-request management task to which the print-mechanism using right is transferred.

FIG. 19 shows the structures of the management information F and G by way of example. The management information F contains the number "3" of the print-request management task to which the print-mechanism using right is next transferred, and the management information G contains the number "1" of the print-request management task 1 so that the print-mechanism using right is returned to the print-request management task 1 per se after the ending of the printing of the task that received the print-mechanism using right.

Figure 20:
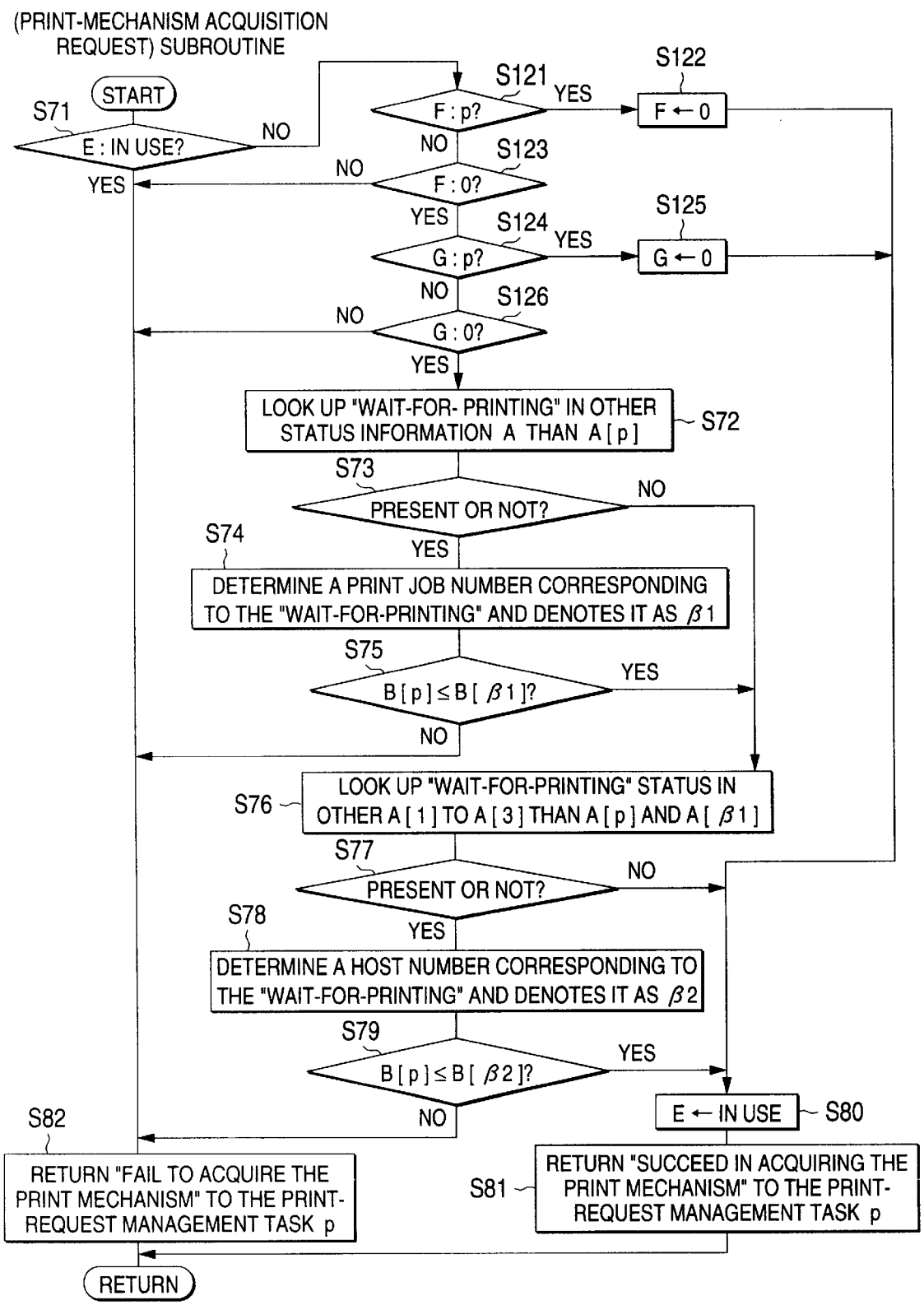
FIG. 20 is a flow chart showing a print-mechanism acquisition request subroutine.

FIG. 20 is a chart showing a processing flow of a print-mechanism acquisition request subroutine. In this routine, if the mechanism-status flag E indicates that the print mechanism 6 is not in use (step S71, NO), management information F and G set as described above are referred to.

In step S121, the print-request management task 1 refers to the management information F to check whether or not the number "p" of a print-request management task now issuing a print request command is present in the management information F. If the number "p" is present (step S80), 0 is set to the management information F (step S122); the mechanism-status flag E is set to a "being in use" status (step S80); and a message "succeed in acquiring the print mechanism" is returned to the print-request management task p (step S81).

If the number "p" is not present in the management information F (step S121), the print-mechanism acquisition request subroutine checks if F=0 (step S123); if F is not 0, the routine judges that there is a print-request management task to which the print-mechanism using right is to be transferred, which the task is not the print-request management task p; and it returns a message "fail to acquire the print mechanism" to the print-request management task p (step S82). Also if the management information G=0, the subroutine judges that the print-request management task waiting for printing is not present, and returns to a normal process from step S72 and the subsequent ones.

As described above, in the printing device of the second embodiment, the next and next-but-one print-request management task to which the print-mechanism using right is to be transferred can be designated by setting the numbers of those tasks in the management information F and G.

In a case where a print-request management task (first task) is interrupted in its printing operation and another print-request management task (second task) is present which is in a "wait-for-printing status and has the number of prints not yet printed is smaller than that of the first task, the print-mechanism using right is preferentially transferred to the first task after the printing operation of the second task ends, by designating the next-but-one print-request management task to which the print-mechanism using right is to be transferred.

Figure 15:
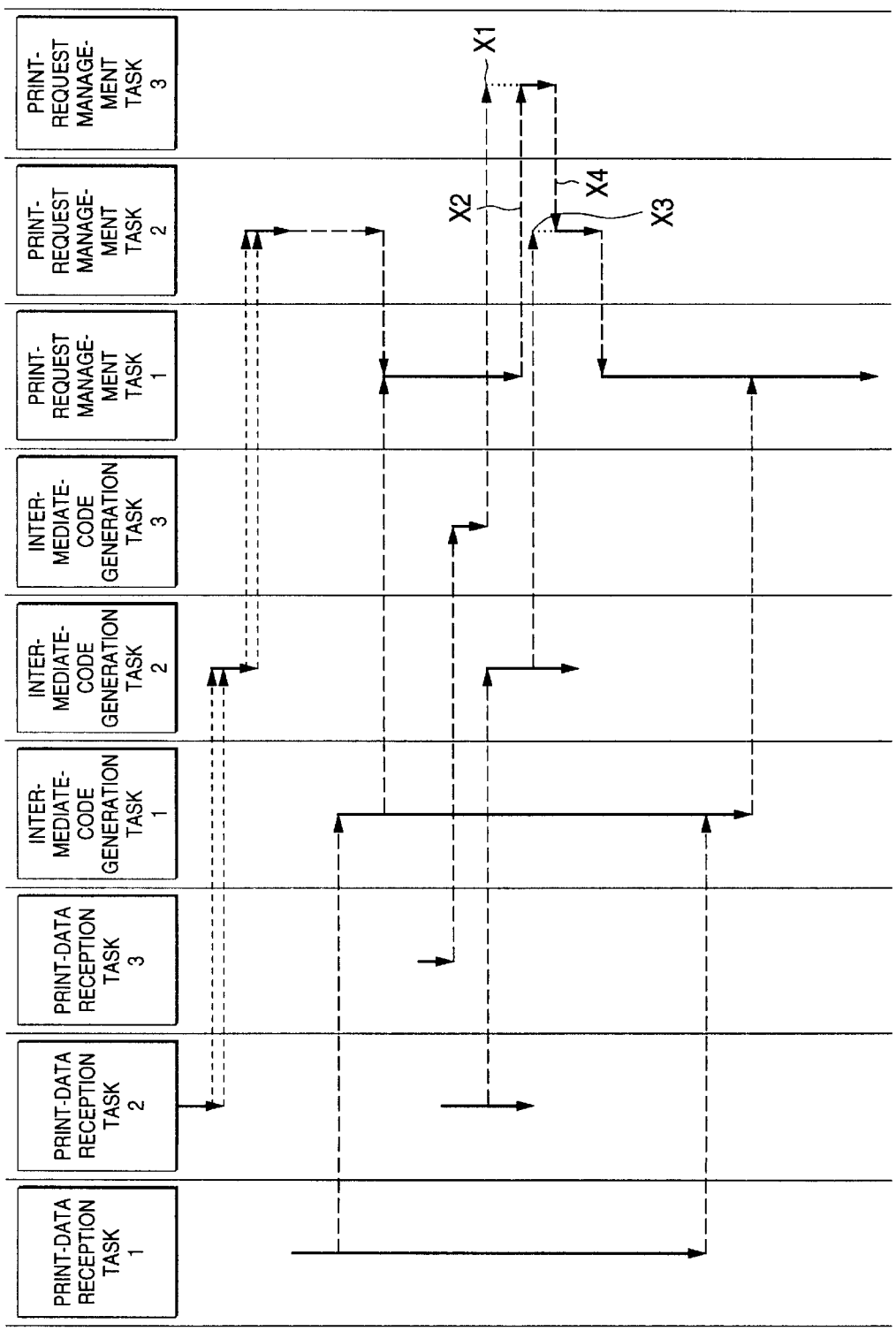
FIG. 15 is a timing diagram showing a process of the first embodiment.
Figure 21:
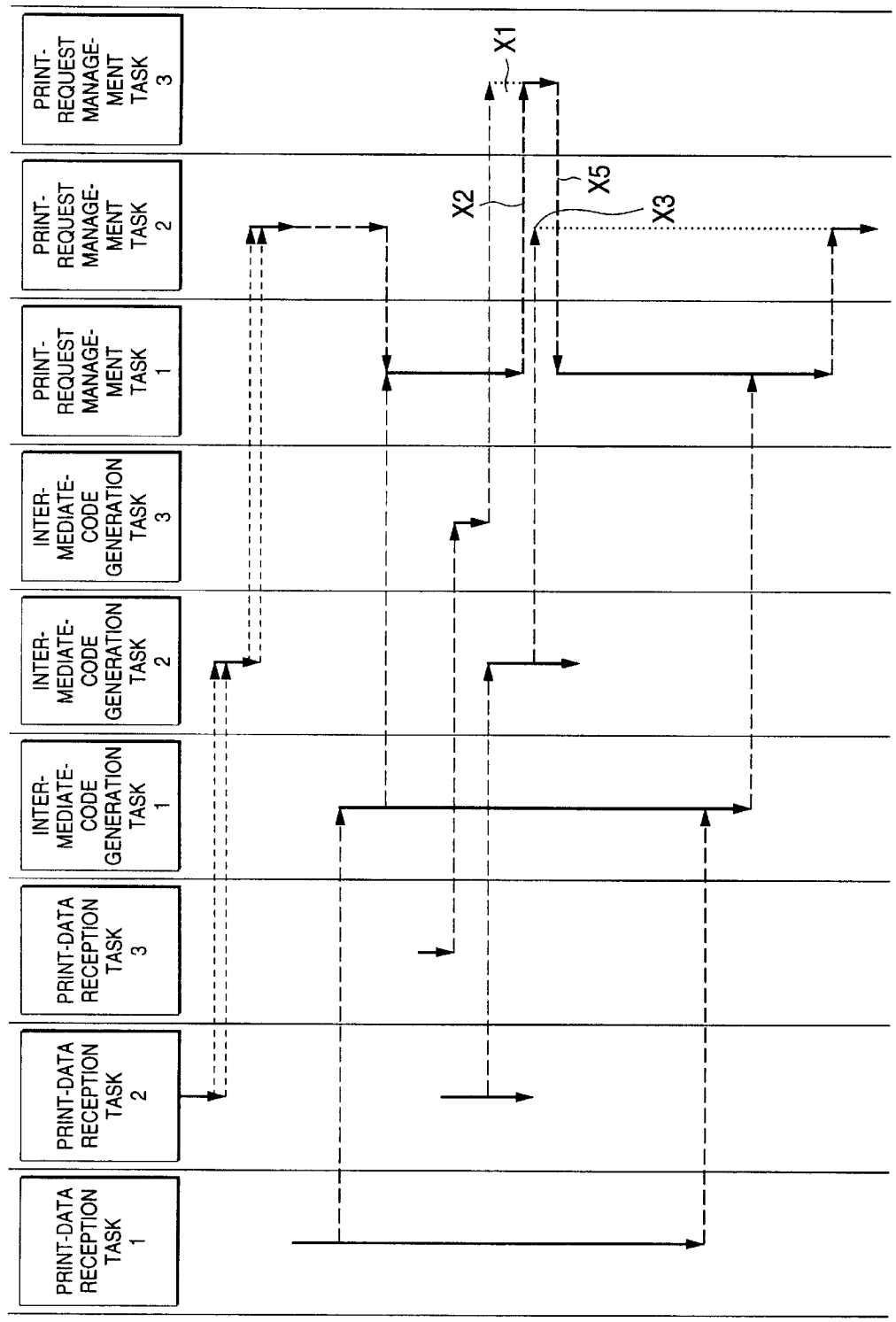
FIG. 21 is a timing diagram showing a process of the second embodiment.

An example of processing flow in the printing device of the second embodiment is charted in FIG. 21 which corresponds to that of FIG. 15. During the execution of the print-request management task 1, another print-request management task 3 is put in a "wait-for-printing" status (X1). Then, the print-request management task 1 judges that the number of prints in the print-request management task 3 is smaller than that of the print-request management task 1, and temporarily abandons the print-mechanism using right and transfers it to the print-request management task 3 (X2). When the printing operation of the print-request management task 3 ends, it abandons the print-mechanism using right, while at this time the print data receiver portion 2 is waiting for printing (X3). In this case, the number of prints of the print-request management task 1 is compared with that of the print-request management task 2. If the number of prints of the print-request managing task 2 is smaller than that of the print-request management task 1, the print-mechanism using right is automatically transferred to the print-request managing task 2 (X4). In the second embodiment, however, the print-mechanism using right may be transferred to the print-request management task 1 by designating the print-request management task 1 per se as the next-but-one print-request management task to which the print-mechanism using right is to be transferred (X5).

Third Embodiment

A third embodiment of the present invention is a modification of the second embodiment. The designations of the management information F and G in the first modification of the third embodiment are different from those in the second embodiment.

When temporarily abandoning the right to use the print mechanism, the print-request management task designates the task itself as the print-request management task to which the print-mechanism using right is to be transferred. In some case, there is no need of designating the task under execution as the task to which the print-mechanism using right is to be transferred. In this case, the task under execution designates the number of the next print-request management task to which the print-mechanism using right is to be transferred, and enters it to the management information F. At this time, the task enters 0 to the management information G (0: no task is not designated). Where the management information F and G are thus set, when the print-request management task under execution abandons the print-mechanism using right, the print-mechanism using right is transferred to the print-request management task designated by the management information F on the basis of the result of the judgement in the step S121 (print-mechanism acquisition request subroutine of FIG. 20). After the printing operation of that task, the print-mechanism using right is transferred depending on the result of the judgement of the process from the step S72 and the subsequent ones in the subroutine of FIG. 20.

Fourth Embodiment

A fourth embodiment of the present invention is a second modification of the second embodiment. The designations of the management information F and G in the second modification of the fourth embodiment are different from those in the second embodiment.

In the fourth embodiment, the print-request management task under execution temporarily transfers the right to use the print mechanism while not designating the next task to which the print-mechanism using right is to be transferred, but the task under execution receives again the print-mechanism using right in the next-but-one printing operation by the print mechanism. In the second modification, the number of the next print-request management task and a special number, e.g., FFFh, other than "0" are entered to the management information F, and the number of the print-request management task under execution is entered to the management information G.

Figure 22:
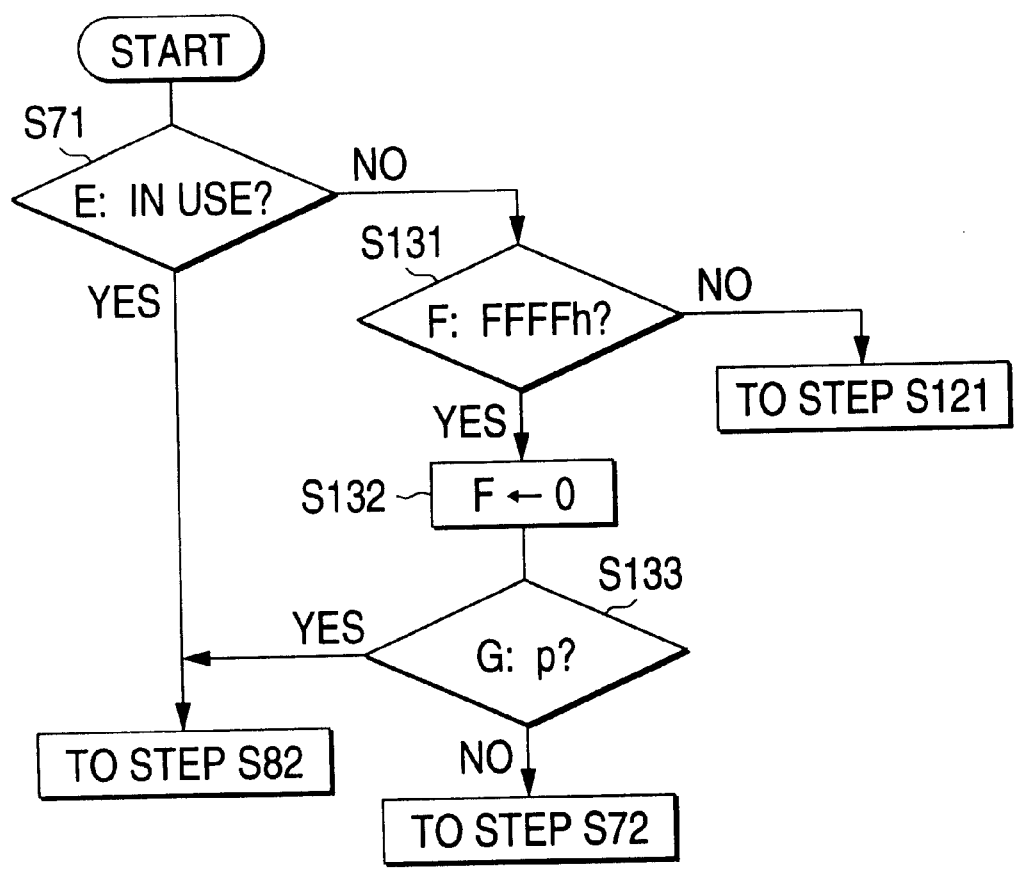
FIG. 22 is a flow chart showing a print-mechanism acquisition request subroutine in a fourth embodiment of the invention.

The print-mechanism acquisition request subroutine is modified as shown in FIG. 22. As shown, if the mechanism-status flag E is not in use in step S71, the print-mechanism acquisition request subroutine checks if F (management information)=FFFh (step S131); if F=FFFFh, the routine enters 0 to the management information F (step S132); it checks if G (management information)=p (step S133); if G=p, it advances to step S82 so as not to transfer the print-mechanism using right; and if G≠p, it executes the processings from step S72 and the subsequent ones for the transferring of the print-mechanism using right. If F≠FFFFh in step S131, the routine traces a route resembling the route from the step S121 and the subsequent ones (FIG. 20).

Fifth Embodiment

A fifth embodiment of the present invention is a third modification of the second embodiment. The designations of the management information F and G in the third modification of the fourth embodiment are different from those of the second embodiment.

In the third modification, the next print-request management task to which the print-mechanism using right is to be transferred is not designated, and hence the print-mechanism using right is transferred to another print-request management task of which the number of prints is smaller than that of the print-request management task under execution. For the transfer of the print-mechanism using right for the next-but-one printing operation, the print-request management task under execution compares the number of prints of another print-request management task being in a "wait-for-printing" with that of the task under execution. If the former is considerably smaller than latter, the task under execution transfers the print-mechanism using right to the print-request management task waiting for printing. If the difference between them is not so large, the task under execution takes the print-mechanism using right in the next printing operation, while not transferring it to the task waiting for printing. In this case, the task under execution enters the number of the next print-request management task and a special number, e.g., FFFh, other than "0" to the management information F, and the number of the task under execution is entered to the management information G.

Figure 23:
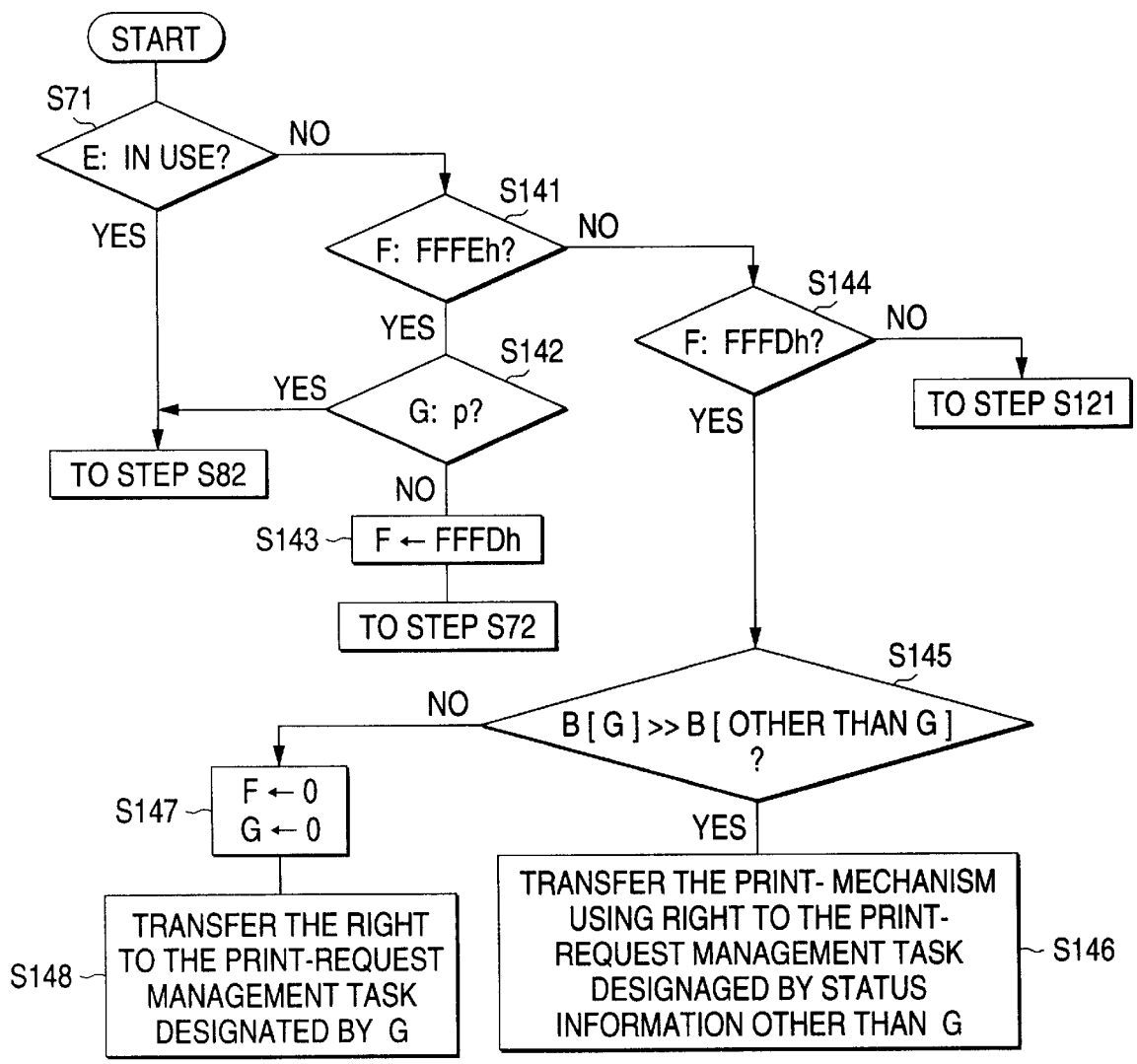
FIG. 23 is a flow chart showing a print-mechanism acquisition request subroutine in a fifth embodiment of the invention.

The print-mechanism acquisition request subroutine is modified as shown in FIG. 23. As shown, if the mechanism-status flag E is not in use in step S71, the print-mechanism acquisition request subroutine checks if F (management information)=FFFh (step S141); if F=FFFFh, it checks if G=p (step S142); if G=p, it advances to step S82 so as not transfer the print-mechanism using right; and if G≠p, it enters FFFDh to the management information F (step S143); and it executes the processings from step S72 and the subsequent ones for the transferring of the print-mechanism using right. If F≠FFFDh (step S141), the routing checks if F=FFFDh (step S144); if F=FFFDh, the routine checks instep S145 if the number of prints not yet printed in a print-request management task being in a "wait-for-printing" (designated by the management information G) is much larger than that in another print-request management task being in a "wait-for-printing"; and if the answer is YES, the routine transfers the print-mechanism using right to the print-request management task having the smaller number of prints (step S145). If the answer is NO (step S145), the routine enters 0 to the management information F and G (step S147), and it transfers the print-mechanism using right to the print-request management task being interrupted in printing (step S148). If F≠FFFDh in step S144, the routine traces a route resembling the route from the step S121 and the subsequent ones (FIG. 20).

The above-mentioned embodiments are each arranged such that the print-request generator prepares a print request of the printing of all the print pages of a print job, and sends it to the print-request management portion. This arrangement is used for ease of explanation. Actually, every time the intermediate code data of one (1) page, two (2) pages or three or more number of pages is generated, the print-request generator prepares a print request and sends it to the print-request management portion 4. Those print requests are then managed by the print-request management portion 4. The total number of print pages are contained in the print data, and when the first print request is first prepared in the print job, the total number of prints is also contained in the print data.

Figure 24:
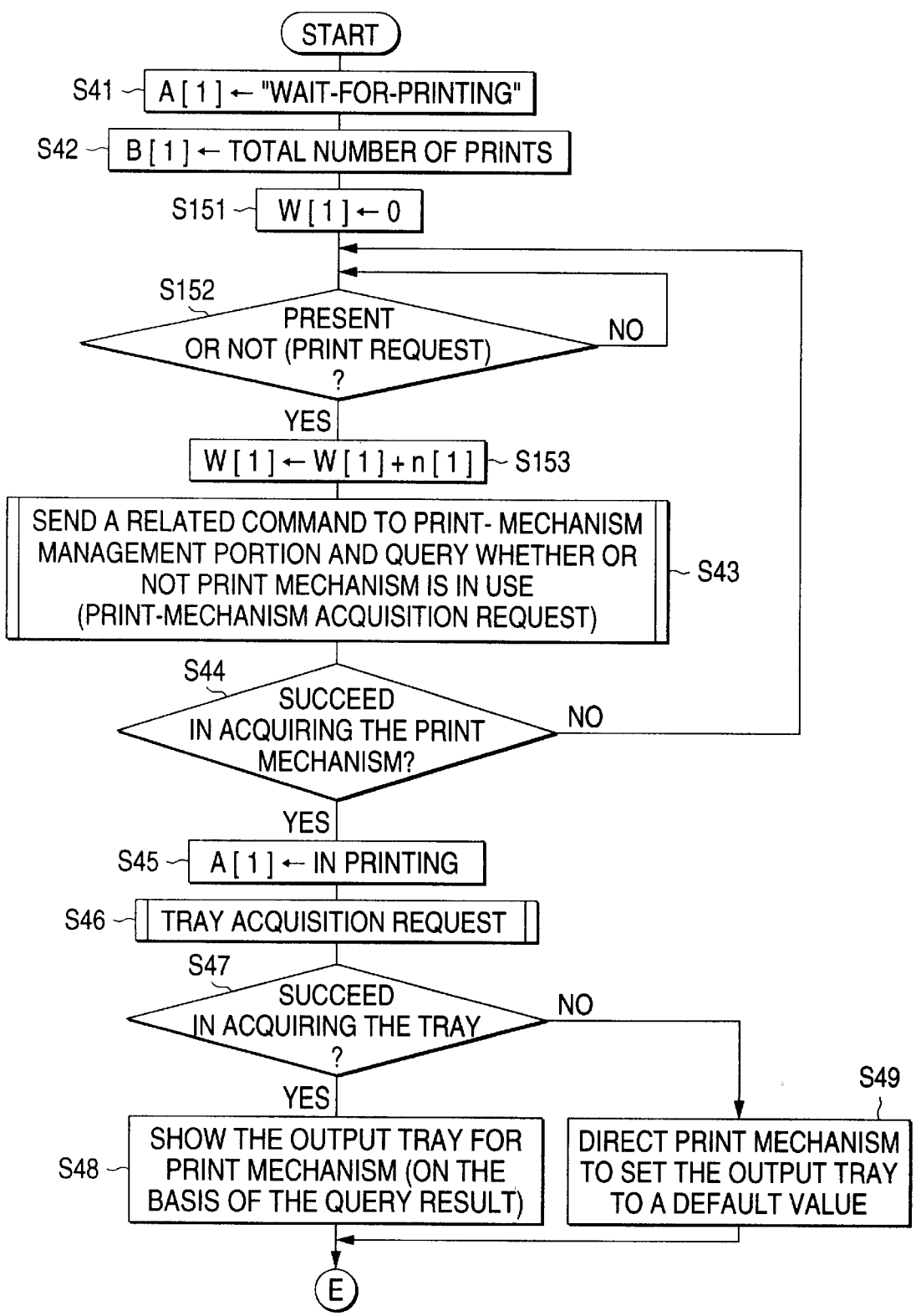
FIG. 24 is a flow chart showing a print-request management task in a sixth embodiment of the invention.
Figure 25:
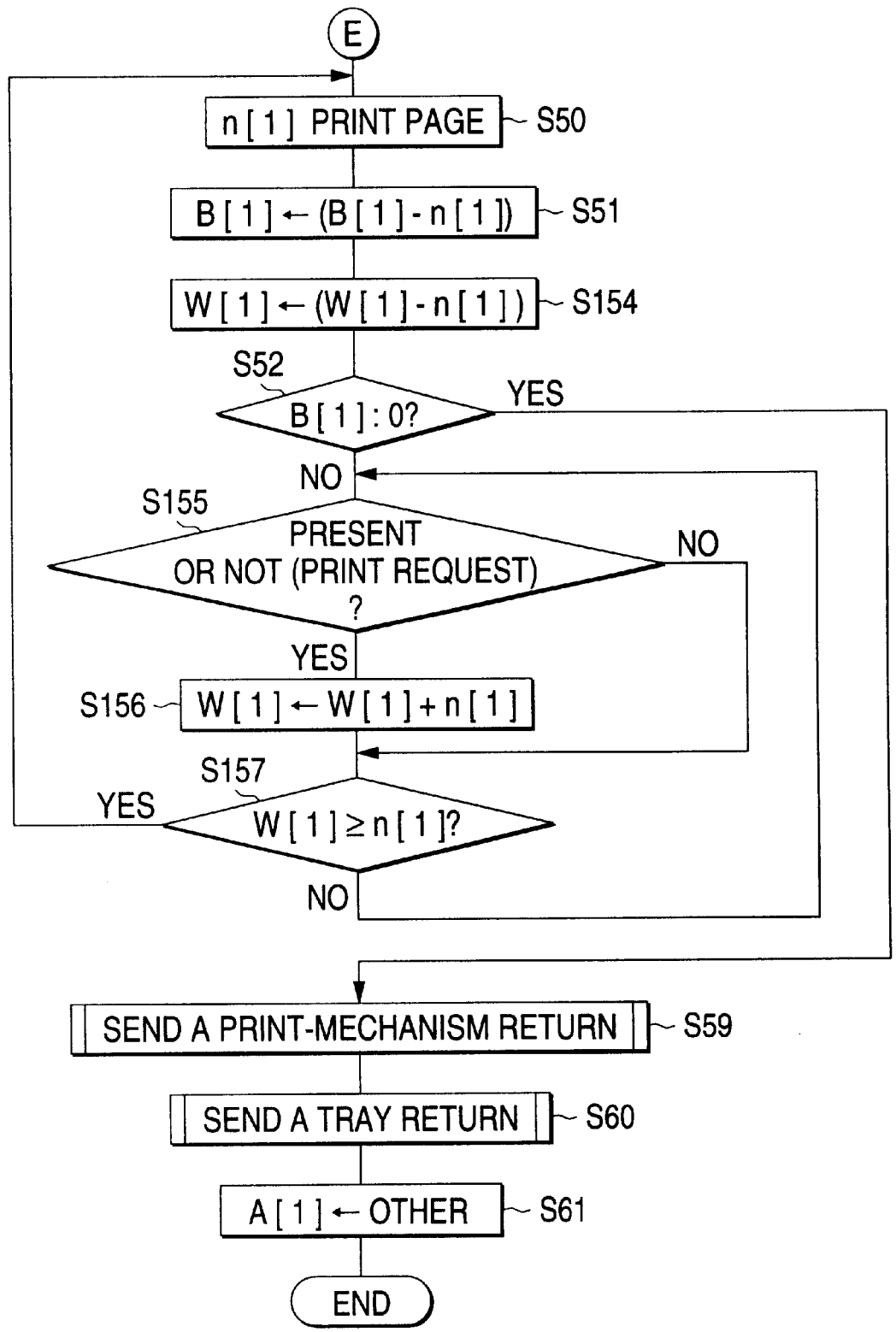
FIG. 25 is a flow chart showing another part of the print-request management task shown in FIG. 24.

A processing flow by a print-request management task when such print requests are generated is shown in FIGS. 24 and 25. The processing flow chart corresponds to that of FIGS. 9 and 10. In FIGS. 24 and 25, like reference numeral designates like steps in FIGS. 9 and 10.

When a print request is generated, the print-request management task enters a "wait-for-printing" to the status information A corresponding to the print job 1 (step S41); the task enters the total number of print pages to the status information B (step S42); the print-request generator sets W[1] to 0 (W[1]: the number of print pages not yet printed of those requested by the print job 1); the print-request management task judges whether a print request is present or not in step S152; if the request is present, the task increments W[1] (=number of the not-yet-printed pages) by n[1] (=number of print pages for each print request) (step S153); and the task issues a print-mechanism acquisition request to query whether or not the print mechanism 6 is in use (step S43). The print-mechanism acquisition request is for calling the above-mentioned subroutine. If the task fails to acquire the print mechanism, the print-request management task repeats the sequence of the processings from step S152 and the subsequent ones. A process to acquire the output tray, which includes the processings from steps S44 to S49, is similar to that of FIG. 9, and hence no further description of it will be given.

Then, the print-request management task sends the intermediate code data of n[1] page as a print unit to the print mechanism 6 which in turn prints the print data of n[1] page (step S50); the task inputs (B[1]–n[1]) to the status information B[1] indicative of the number of print pages not yet printed (step S51); and the task enters (W[1]–n[1]) to W[1] (step S154). When W[1]≧n[1] (step S157, YES), the task returns to step S50 where the printing operation is performed; and when W[1]<n[1] (step S157, NO), the task returns to step S155 and waits for the next print request. When B[1]=0 (step S52, YES), the printing operation ends, and the task sends a print-mechanism return (meaning the abandoning of the right to use the print mechanism 6) to the print-mechanism management portion 5 (step S59); the task sends a tray return (indicating the end of using the output tray) to the print-mechanism management portion 5 (step S60); and the task enters "other status" to the status information A[1] (step S61). The step S59 is for calling the print-mechanism return informing subroutine already stated, and the step S60 is for calling the tray-return informing subroutine already stated.

The above-mentioned processing flow of the print-request management task shows an example of an actual processing flow of each of the above-mentioned embodiments, although the sequence of processings steps S52 to S58, (viz., the print-request management task, when under printing, checks a status of another print job waiting for printing and, if necessary, stops its printing) is omitted. While the number of prints n[1] for each print request is fixed in the description of the processing flow mentioned above, it may dynamically be varied.

Seventh Embodiment

In each of the above-mentioned embodiments, as seen in particular from the fifth embodiment, when a print job, which is under printing, contains a print page that consumes much time in generating its intermediate code data owing to complexity of image depiction, for example, the print-request management task repeats the sequence of processings from steps S155 to S157 (FIG. 25). In this case, the print-request management task occupies the print mechanism although an actual printing is not performed by the print mechanism, viz., the print mechanism is idle. The seventh embodiment eliminates such an idling of the print mechanism. In the printing device of this embodiment, when the time-consuming print page appears, the print-request management task under execution transfers the print-mechanism using right to another print-request management task which is waiting for printing.

Figure 26:
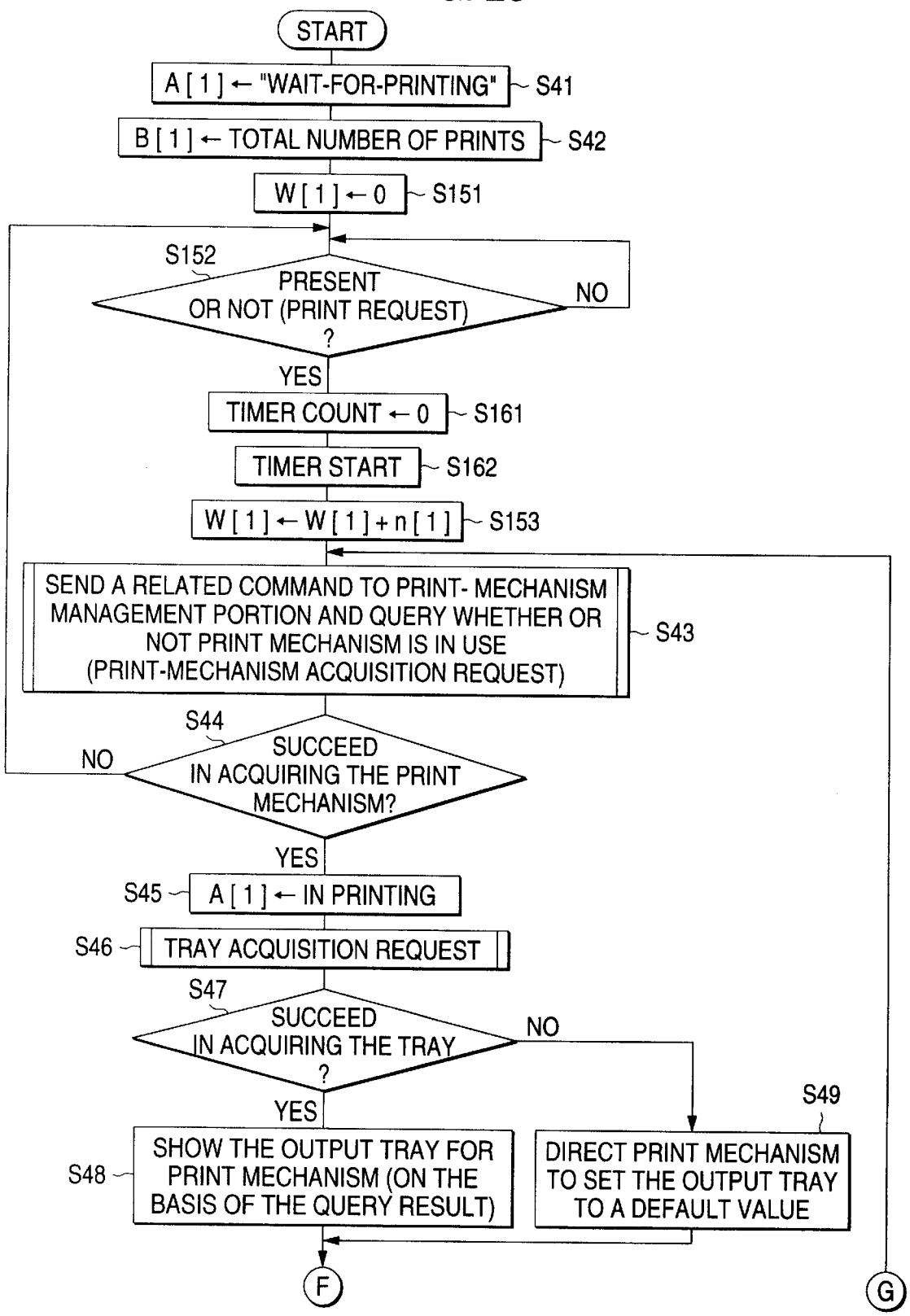
FIG. 26 is a flow chart showing a print-request management task in a seventh embodiment of the invention.
Figure 27:
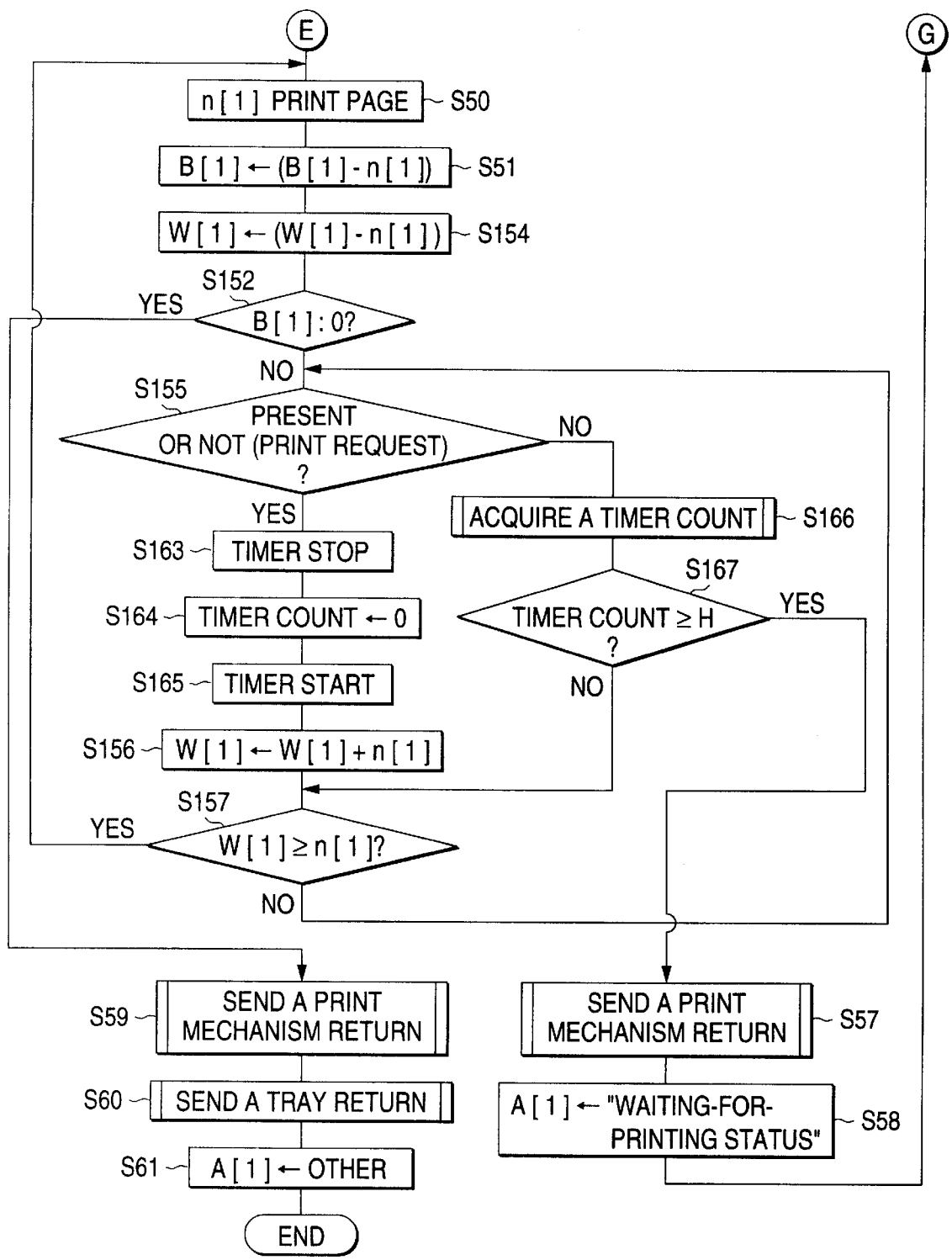
FIG. 27 is a flow chart showing another part of the print-request management task shown in FIG. 26.
Figure 28:
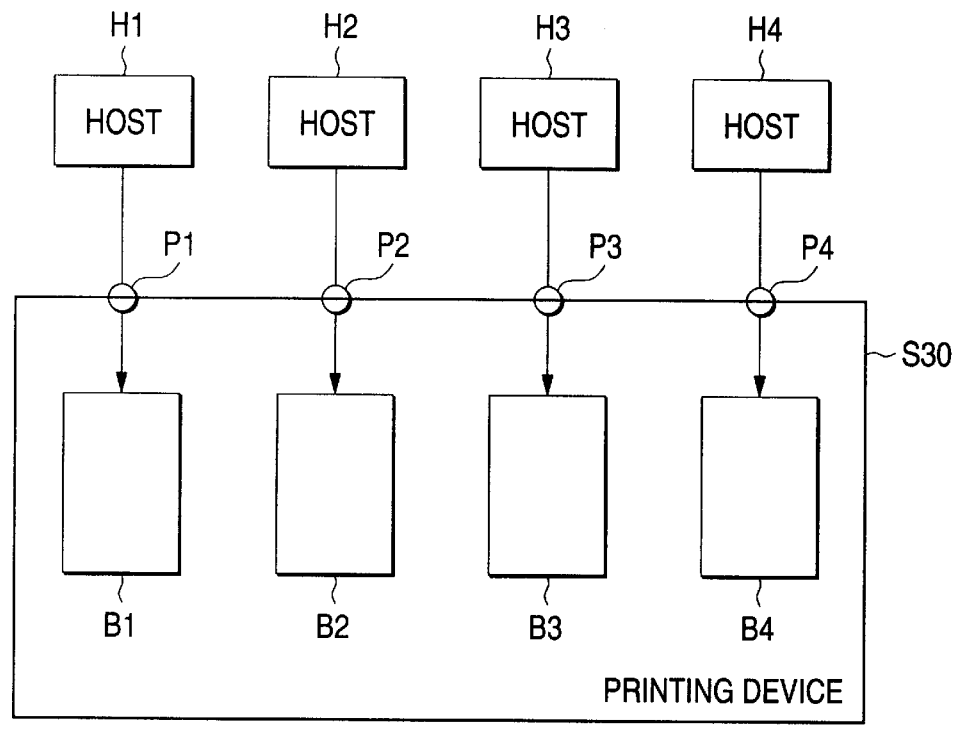
FIG. 28 is a block diagram showing a conventional printing device.
Figure 29:
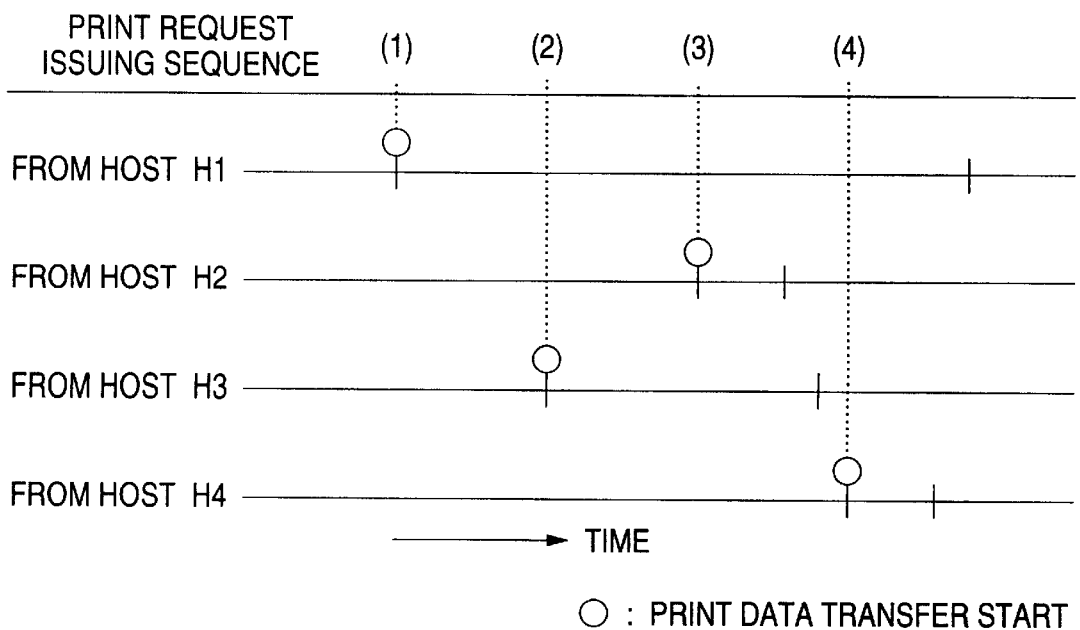
FIG. 29 is a timing diagram showing sequence of processings in a print job used in a conventional printing device and FIG. 30 is a flow chart showing a process in the conventional printing device.
Figure 30:
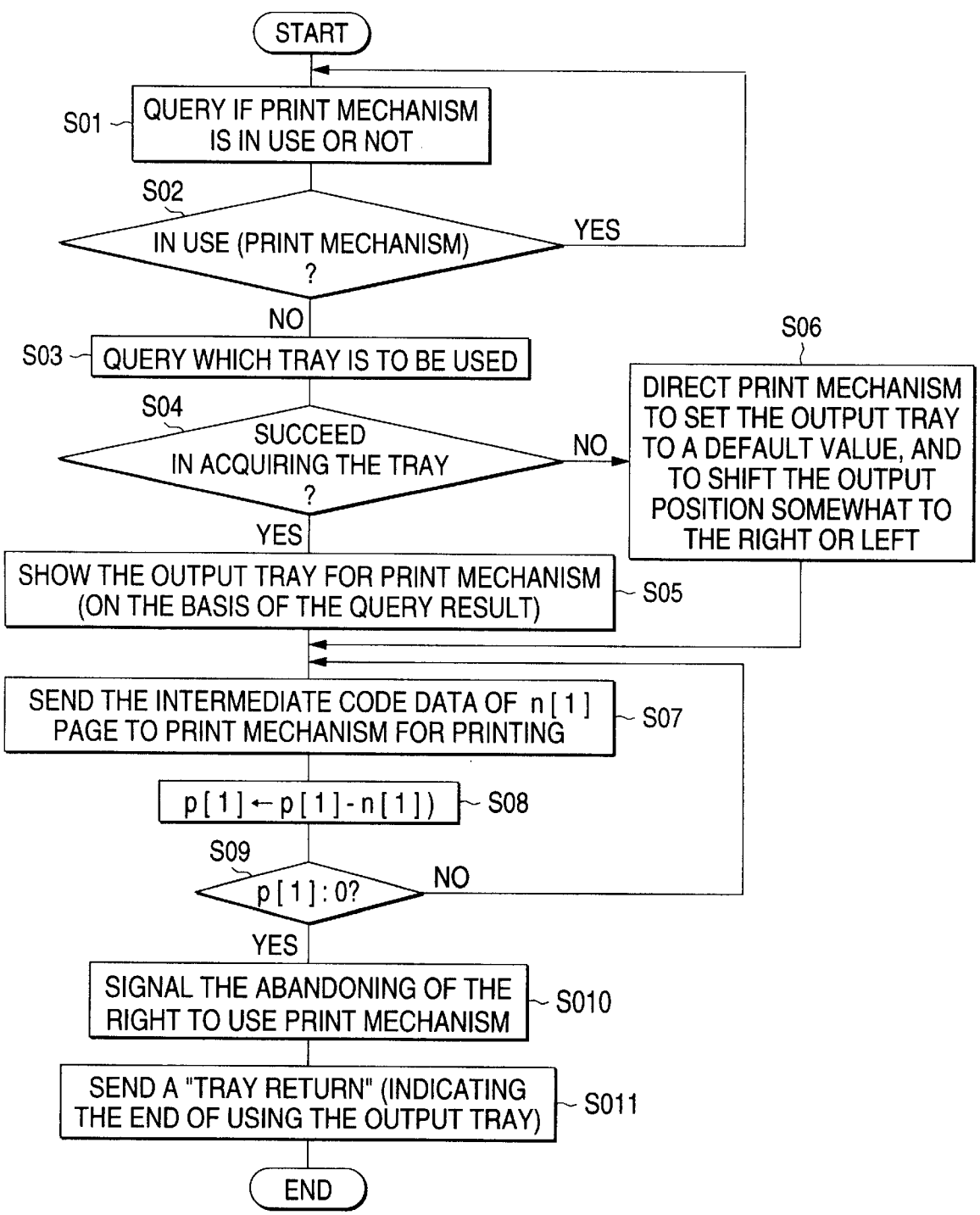

FIGS. 26 and 27 cooperate to show a processing flow in the seventh embodiment. In these figures, like reference numerals are used for designating like steps in the processing flow in FIGS. 24 and 25.

The printing device of this embodiment includes a timer for counting a time for the print job under printing to wait for the subsequent print request. If a print request is issued (step S152, YES), the print job, or the print-request management task under printing, resets a timer count to 0 (step S161, YES), and causes the timer to start its counting (step S162). The timer counts a time till the next print request is issued. If the next print request is present (step S155, YES), the task stops the operation of the timer to reset its count (step S163); it resets a timer count to 0 (step S164); the task starts again the timer (step S165); and the task advances to step S156.

After the printing, if the next print request is not present (step S155, NO), the task acquires a timer count (step S166); the task compares the acquired timer count with a preset time H (step S167); and if it is in excess of the preset time H, the task judges that the print page consumes much time for generating its intermediate code data, and abandons the print-mechanism using right and enters a "wait-for-printing" to the status information A[1] (step S58). The preset time H is the sum of a time taken for printing the number of prints n[1] for one print request plus a preset margin time. The time H may be fixed or dynamically varied with the margin being variable. The step S57 is for calling the print-mechanism return knowing subroutine.

As described above, when much time is taken for generation of the intermediate code data takes much time or the data transfer from the host computer (by come causes in the host computer or the network), the printing device of the seventh embodiment operates such that a print-request management task under execution abandons the right to use the print mechanism and transfers it to another print-request management task waiting for printing, whereby the print mechanism 6 may be used more efficiently.

In the seventh embodiment, when a time count is larger than a preset time H (step S167), the print-request management task under execution abandons the print-mechanism using right unconditionally. If necessary, the task may abandon the print-mechanism using right conditionally. Specifically, when the time count is larger than the preset time H, the task checks whether or not another print-request management task is waiting for printing, viz., the status information A is a "wait-for-printing", and only when it is waiting for printing, the task under execution abandons the print-mechanism using right. Further, the task checks the number of prints in the print-request management task waiting for printing, and only when the number of prints is smaller than a preset number of prints, for example, it is much smaller than the number of prints of the task under execution, the task abandons the print-mechanism using right.

In a case where a plural number of print-request management tasks which are waiting for printing are present when the printing operation is interrupted, the print-mechanism using right may be transferred to the print-request management task having the smallest number of prints of those tasks as in the first embodiment. The right may also be transferred to the print-request management task being interrupted in its printing. In this case, information of "printing being interrupted" is added to the status information A. Further, the following method may also be used for determining the print-request management task to which the print-mechanism using right is to be transferred. The order of executing the print-request management tasks is any of the orders of; the print-data reception start times of the print data receiver portion 2, the print-data reception completion times by the same, the intermediate-code generation start times by the intermediate-code generator portion 3, the intermediate-code generation completion times by the same; and the like. The information on the task execution order is added to the status information A, and the print-mechanism using right is transferred to the print-request management task of the highest task execution order.

Another method to determine the print-request management task to which the print-mechanism using right is to be transferred is to use the management information F and G as in the second to fifth embodiments. In this case, information of the numbers of the next and next-but-one print-request management tasks to which the print-mechanism using right is to be transferred are set in the management information F and G. A possible method to return the print-mechanism using right to the print-request management task under execution in the next-but-one printing operation, is that the number of not yet printed print pages of the task under execution is compared with that of another print-request management task waiting for printing, and only when a predetermined condition of the number of prints is satisfied, the right is transferred to the task under execution. The methods of the first to sixth embodiments to determine the print-request management task to which the print-mechanism using right is to be used, viz., in a situation a print-request management task is under printing and another print-request management task is waiting for printing, the former task abandons the print-mechanism using right on the basis of the results of predetermined judgements, may be properly combined, whereby further efficient use of the print mechanism is realized.

The seventh embodiment judges that the generation of the intermediate code data takes much time when a count time of the timer is in excess of a preset time. In this case, a time taken for generating the intermediate code data may be predicted in advance on the basis of the features of the depicting commands, e.g., the kinds and number of depicting commands.

Eighth Embodiment

In the above-mentioned embodiments, the print request generator generates a print request, basically, for one side of one printing sheet. When the printing device is of both-side printing type, a print request may be generated for the data of two pages, and the data is printed on both sides of a printing sheet. In a case where data of n number of pages is compressed into data of one page, and the resultant is printed on one side of a printing sheet, a print request is generated for the data of n number of pages.

In the aforementioned embodiments, the print-mechanism management portion employs the subroutine-basis processing. Alternatively, a print-mechanism management task is used, and the subroutines are executed interactively with the print-mechanism management task.

Descriptions of the embodiments of the invention have been made on the assumption that the printing device is a page printer. It is evident that the present invention is applicable to any of other types of the printing devices, such as ink jet printers, thermal printers and dot-impact printers.

As seen from the foregoing description, according to the present invention, image forming and printing processes based on a plural number of print jobs can be executed in the best orders depending on the number of print pages.

What is claimed is:

1. A printing device comprising:

receiving means for receiving print data of a plural number of print jobs concurrently;

intermediate code generating means for concurrently generating intermediate code data directly from said print data for each of said print jobs received by said receiving means;

a print mechanism for generating bit images on the basis of said intermediate code data and for printing in accordance with said bit images; and print management means for making a comparison of a first print job in an active state with a second print job in a wait state to determine when said first print job is to be interrupted and said second print job is to be printed thus changing said second print job from said wait state to said active state, wherein said interrupting of said first print job is performed when a relationship between said first print job and said second print job satisfies a predetermined condition and wherein the print management means makes said comparison whenever said intermediate code data is generated for a complete page in said wait state.

2. The printing device according to claim 1, wherein said intermediate code generating means accounts for said intermediate code data resulting in a one sided page of a print medium and said intermediate code data resulting in a two sided page print medium.

3. The printing device according to claim 1, wherein said print management means makes said comparison when said intermediate code data has been generated for all of said plural number of print jobs.

4. The printing device according to claim 1, wherein said predetermined condition of said comparison is whether said print job in said wait state includes a respective number of prints smaller than a respective number of prints of said print job in said active state by a predetermined number of prints, wherein when said predetermined condition is satisfied, said print job in said active state is interrupted and one of said print jobs having said wait state and also having said smallest number of said prints is selected for printing.

5. The printing device according to claim 4, wherein said print management means determines which of said plurality of print jobs in said wait state is said print job with said smallest number of prints.

6. The printing device according to claim 4, wherein said print management means selects at least one print job from said plurality of print jobs in said wait state, for printing in the order of:

a) print-data reception start times of said receiving means, b) print-data reception completion times by said receiving means, c) intermediate-code generation start times by said intermediate code generating means, and d) intermediate-code generation completion times by said intermediate code generating means.

7. The printing device as in one of claims 4–6, further comprising a plurality of output trays, wherein said relationship between said first print job and said second print job takes into account the manner in which said selected print job will be outputted into said plurality of output trays.

8. The printing device according to claim 7, further comprising a jogger, wherein one of said bit images is printed onto a print medium and outputted into one of said plurality of trays or said jogger.

9. The printing device according to claim 4, wherein said print management means selects only a next print job to be printed.

10. The printing device according to claim 4, wherein said print management means selects a next and a next-but-one print job to be printed.

11. The printing device according to claim 10, wherein said print management means selects, as said next but one print job, said interrupted print job.

12. The printing device according to claim 10, wherein before the printing of said already selected next-but-one print job, said print management means makes said comparison, and causes said print mechanism to preferentially print all of said plural number of print jobs for which said predetermined condition is satisfied.

13. The printing device according to claim 1, wherein said intermediate code generating means includes a print-request output means for issuing a print request every time said intermediate code data for said print job is generated, and said print management means selects between said print jobs in said wait state on the basis of said print request for which said predetermined condition is meet.

14. A printing device comprising:

receiving means for receiving print data of a plural number of print jobs concurrently;

intermediate code generating means for concurrently generating intermediate code data directly from said print data for each of said print jobs received by said receiving means;

a print mechanism for generating bit images on the basis of said intermediate code data and for printing in accordance with said bit images; and first storing means for storing, for each print job, information representing an under-printing status, a wait-for-printing status, and other status;

second storing means for storing, for each print job, information representing the number of prints not yet printed of each print job; and print management means for interrupting the printing operation of a print job under printing on the basis of the information of said first and said second storing means, for selecting any print jobs in said wait state, and for causing said print mechanism to preferentially print said selected print job waiting for printing;

wherein the print management means makes a decision as to whether to perform said interrupting whenever said intermediate code data is generated for a complete page in said wait-for-printing status.

15. The printing device according to claim 14, further comprising:

third storing means for storing information representing empty states of a plural number of output trays; and fourth storing means for storing information representing which output tray or output trays are being used;

wherein said print management means interrupts the printing operation of a print job in an active state on the basis of the information contained in any one of said first, said second, said third, or said fourth storing means, for selecting any of said print jobs in a wait state for printing, and for causing said print mechanism to preferentially print said selected print job waiting for printing.

16. The printing device according to claim 14, further comprising:

fifth storing means for storing information concerning the status of said print mechanism and whether said print mechanism is in use, wherein said print management means interrupts the printing operation of said print job in an active state on the basis of the information contained in any one of said first, said second and said fifth storing means, selects one of said print jobs in said wait state for printing, and causes said print mechanism to preferentially print said selected print job.

17. The printing device according to claim 15, further comprising:

fifth storing means for information concerning the status of said print mechanism and whether said print mechanism is in use, wherein said print management means interrupts the printing operation of said print job under printing on the basis of said information stored in any of said first storing means, said second storing means, said third storing means, said fourth storing means and said fifth storing means, selects one of said print jobs in said wait state for printing, and causes said print mechanism to preferentially print said selected print job.

18. A printing order control method comprising the steps of:

receiving print data of a plural number of print jobs concurrently;

generating concurrently intermediate code data directly from said print data for each of said print jobs received by said receiving means;

executing a predetermined comparison process for making a comparison, of a first print job in an active state with a second print job in a wait state, to determine when said first print job is to be interrupted and said second job is to be printed, wherein said interrupting of said first print job is performed when the relationship between said first print job and said second print job satisfies a predetermined condition; and selecting any one of said print jobs in said wait state for printing, and causing said print mechanism to print said selected print job earlier than the remaining print jobs;

wherein said predetermined comparison process is performed whenever said intermediate code data is generated for a complete page in said wait state.

19. A printing device comprising:

a receiving device for receiving print data of a plural number of print jobs concurrently;

an intermediate code generating device for concurrently generating intermediate code data directly from said print data for each of said print jobs received by said receiving device;

a print mechanism for generating bit images on the basis of said intermediate code data and for printing in accordance with said bit images; and a print management device for making a comparison of a first print job in an active state with a second print job in a wait state to determine when said first print job is to be interrupted and said second print job is to be printed thus changing said first print job from said active state to said wait state and said second print job from said wait state to said active state, wherein said interrupting of said first print job is performed when the relationship between said first print job and said second print job satisfies a predetermined condition;

wherein said comparison is performed whenever said intermediate code data is generated for a complete page in said wait state.

20. The printing device according to claim 19, wherein said intermediate code generating device accounts for said intermediate code data resulting in a one sided page of a print medium and said intermediate code data resulting in a two sided page print medium.

21. The printing device according to claim 19, wherein said print management device makes said comparison when said intermediate code data has been generated for all of said plural number of print jobs.

22. The printing device according to claim 19, wherein said predetermined condition of said comparison is whether said print job in said wait state includes a number of prints smaller than said number of prints of said print job in said active state by a predetermined number of prints, wherein when said predetermined condition is satisfied, said print job in said active state is interrupted and one of said print jobs having said wait state and said smallest number of said prints is printed.

23. The printing device according to claim 22, wherein said print management device determines which of said plurality of print jobs in said wait state is said print job with said smallest number of prints.

24. The printing device according to claim 22, wherein said print management device selects at least one print job from said plurality of print jobs in said wait state, for printing, in the order of:

a) print-data reception start times of said receiving device, b) print-data reception completion times by said receiving device, c) intermediate-code generation start times by said intermediate code generating device, and d) intermediate-code generation completion times by said intermediate code generating device.

25. The printing device as in claim 22, further comprising a plurality of output trays, wherein said relationship between said first print job and said second print job takes into account the manner in which said selected print job will be outputted into said plurality of output trays.

26. The printing device according to claim 25, further comprising a jogger, wherein one of said bit images is printed onto a print medium and outputted into one of said plurality of trays and said jogger.

27. The printing device according to claim 22, wherein said print management device selects only a next print job to be printed.

28. The printing device according to claim 22, wherein said print management device selects a next and a next-but-one print job to be printed.

29. The printing device according to claim 28, wherein said print management device selects, as said next but one print job, said interrupted print job.

30. The printing device according to claim 29, wherein before the printing of said already selected next-but-one print job, said print management device makes said comparison, and causes said print mechanism to preferentially print all of said plural number of print jobs for which said predetermined condition is satisfied.

31. The printing device according to claim 19, wherein:

said intermediate code generating device includes a print-request output device for issuing a print request every time said intermediate code data for said print job is generated, and said print management device selects between said print jobs in said wait state, for which said predetermined condition has been meet, on the basis of said print request.

\* \* \* \* \*